US012230007B2

United States Patent
He et al.

(10) Patent No.: US 12,230,007 B2
(45) Date of Patent: Feb. 18, 2025

(54) TRAINING METHOD FOR MULTI-OBJECT TRACKING MODEL AND MULTI-OBJECT TRACKING METHOD

(71) Applicant: Beijing Tusen Zhitu Technology Co., Ltd., Beijing (CN)

(72) Inventors: Jiawei He, Beijing (CN); Zehao Huang, Beijing (CN); Naiyan Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 422 days.

(21) Appl. No.: 17/649,511

(22) Filed: Jan. 31, 2022

(65) Prior Publication Data

US 2022/0245924 A1 Aug. 4, 2022

(30) Foreign Application Priority Data

Jan. 29, 2021 (CN) .......................... 202110130055.4

(51) Int. Cl.
| | |
|---|---|
| *G06K 9/00* | (2022.01) |
| *G06T 7/246* | (2017.01) |
| *G06V 10/20* | (2022.01) |
| *G06V 10/62* | (2022.01) |

(52) U.S. Cl.
CPC .............. *G06V 10/62* (2022.01); *G06T 7/246* (2017.01); *G06V 10/255* (2022.01); *G06T 2207/10016* (2013.01)

(58) Field of Classification Search
CPC ................................ G06T 7/246; G06V 10/62
See application file for complete search history.

(56) References Cited

PUBLICATIONS

Wang, Gaoang, et al. "Exploit the connectivity: Multi-object tracking with trackletnet." Proceedings of the 27th ACM international conference on multimedia. 2019. (Year: 2019).*
Wang, Jiahui, et al. "Semi-online multiple object tracking using graphical tracklet association." IEEE Signal Processing Letters 25.11 (2018): 1725-1729. (Year: 2018).*

(Continued)

*Primary Examiner* — Gregory A Morse
*Assistant Examiner* — Owais Iqbal Memon
(74) *Attorney, Agent, or Firm* — Perkins Coie LLP

(57) ABSTRACT

An embodiment of the present disclosure discloses a training method for a multi-object tracking model and a multi-object tracking method. The multi-object tracking method comprises: constructing an object graph according to objects to be tracked in a current frame, wherein the vertexes of the object graph correspond to the objects to be tracked, and edge features of the edges between the two vertexes comprise an attribute relationship between the two vertexes; performing graph matching on the object graph and a tracklet graph to calculate matching scores between the object to be tracked and the tracked tracklet in the tracklet graph, wherein the vertexes of the tracklet graph correspond to tracked tracklets, and the edge features of the edges between the two vertexes comprise an attribute relationship between the two vertexes; and determining the matched tracklet of the object to be tracked according to the matching scores.

19 Claims, 7 Drawing Sheets

(56) References Cited

PUBLICATIONS

Zhang, Li, Yuan Li, and Ramakant Nevatia. "Global data association for multi-object tracking using network flows." 2008 IEEE conference on computer vision and pattern recognition. IEEE, 2008. (Year: 2008).*

Ardo, Hakan, and Mikael Nilsson. "Multi target tracking from drones by learning from generalized graph differences." Proceedings of the IEEE/CVF International Conference on Computer Vision Workshops. 2019. (Year: 2019).*

Zheng, Dayu, Hongkai Xiong, and Yuan F. Zheng. "A structured learning-based graph matching for dynamic multiple object tracking." 2011 18th IEEE International Conference on Image Processing. IEEE, 2011. (Year: 2011).*

Ma, Cong, et al. "Deep association: End-to-end graph-based learning for multiple object tracking with conv-graph neural network." Proceedings of the 2019 on international conference on multimedia retrieval. 2019. (Year: 2019).*

Brasó, Guillem, and Laura Leal-Taixé. "Learning a neural solver for multiple object tracking." Proceedings of the IEEE/CVF conference on computer vision and pattern recognition. 2020. (Year: 2020).*

Schulter, Samuel, et al. "Deep network flow for multi-object tracking." Proceedings of the IEEE Conference on Computer Vision and Pattern Recognition. 2017. (Year: 2017).*

Kuhn, H.W. "The Hungarian Method for the Assignment Problem", Naval Research Logistics Quaterly, vol. 2, Issue 1-2, ages 83-97, Mar. 1955.

Kipf, Thomas N. et al. "Semi-Supervised Classification with Graph Convolutional Networks," arxiv:1609.02907v4 [cs.LG], pp. 1-14, Feb. 2017.

Battaglia, Peter W et al. "Relational inductive biases, deep learning, and graph networks," ArXiv .: 1806.01261v3 [cs.LG], pp. 1-40, Oct. 17, 2018.

Braso, Guillem, et al. "Learning a Neural Solver for Multiple Object Tracking," Open Access, The CVF, pp. 1-11, (2020).

Li, Jiahe et al. "Graph Networks for Multiple Object Tracking" Proceedings of the IEEE/CVF Winter Conference on Applications of Computer Vision (WACV), 2020, pp. 719-728.

European Patent Office, Extended European Search Report for EP 22150364.2, Mailing Date: Jul. 21, 2022, 9 pages.

Zheng, Dayu, et al., "A structured learning-based graph matching for dynamic multiple object tracking", Image Processing (ICIP), 2011 18th IEEE International Conference on Image Processing, Sep. 11, 2011, p. 2333-2336.

Schulter, Samuel, et al., "Deep Network Flow for Multi-Object Tracking", 2017 IEEE Conference on Computer Vision and Pattern Recognition (CVPR), Jul. 21, 2017, p. 2730-2739, IEEE Computer Society, NEC Laboratories, Media Analytics Department, Cupertino, CA, USA.

European Patent Office, Communication pursuant to Article 94(3) EPC for EP Appl. No. 22150364.2, 4 pages.

* cited by examiner

TRAINING METHOD FOR MULTI-OBJECT TRACKING MODEL AND MULTI-OBJECT TRACKING METHOD

MULTI-OBJECT TRACKING METHOD

The present disclosure claims priority to Chinese Patent Application No. 202110130055.4, titled "TRAINING METHOD FOR MULTI-OBJECT TRACKING MODEL AND MULTI-OBJECT TRACKING METHOD", filed on Jan. 29, 2021, the content of which is incorporated herein by reference in its entirety.

TECHNICAL FIELD

An embodiment of the present disclosure relates to video data processing, in particular to a training method for a multi-object tracking model and a multi-object tracking method.

BACKGROUND

With the rapid development of computer vision and deep learning, video multi-object tracking algorithm has been widely applied to the fields of intelligent monitoring, robot vision system, virtual reality (VR) and the like, so as to focus on the movement tracks of object objects in a video over time.

At present, the existing multi-object tracking algorithm is mainly divided into two stages: object detection and object tracking, objects in each video frame may be detected frame by frame in the object detection stage, then the features of objects in each video frame may be extracted through a neural network model in the object tracking stage, and the same object in continuous video frames is associated by adopting a bipartite matching algorithm according to the feature similarity between the object in the previous video frame and the object in the next video frame in each adjacent video frame, so that the movement tracklets of objects in the video are obtained.

SUMMARY

Various embodiments of the present disclosure provide a training method for a multi-object tracking model and a multi-object tracking method, so as to implement accurate tracking of multiple objects in a video, avoid limitations of video multi-object tracking, and improve robustness of video multi-object tracking.

In a first aspect, an embodiment of the present disclosure provides a training method for a multi-object tracking model comprising: constructing an initial multi-object tracking model, wherein the multi-object tracking model comprises an object graph extraction network, a tracklet graph extraction network and a graph matching network; the object graph extraction network is configured for constructing an object graph according to objects to be tracked in a current video frame, the tracklet graph extraction network is configured for constructing a tracklet graph according to tracked tracklets in a historical video frame, and the graph matching network is configured for performing graph matching on the object graph and the tracklet graph to predict a matched tracklet of the object to be tracked; wherein the object graph and the tracklet graph comprise vertexes and edges connecting the vertexes, the vertexes of the object graph correspond to the objects to be tracked, the vertexes of the tracklet graph correspond to the tracked tracklets, and the edge features of the edges between the two vertexes in the object graph and the tracklet graph comprise an attribute relationship between the two vertexes; and performing joint training on networks in the multi-object tracking model according to a real matched tracklet and a predicted matched tracklet of the object to be tracked in training samples by adopting a preset loss function of the multi-object tracking model to obtain the trained multi-object tracking model.

In a second aspect, an embodiment of the present disclosure provides a multi-object tracking method comprising: constructing an object graph according to objects to be tracked in a current video frame, wherein the object graph comprises first vertexes and first edges connecting the first vertexes, the first vertexes of the object graph correspond to the objects to be tracked, and the edge features of the first edges between the two vertexes comprise an attribute relationship between the two first vertexes; performing graph matching on the object graph and a tracklet graph to calculate matching scores between the object to be tracked and a tracked tracklet in the tracklet graph, wherein the tracklet graph comprises second vertexes and second edges connecting the second vertexes, the second vertexes of the tracklet graph correspond to tracked tracklets, and the edge features of the second edges between the two second vertexes comprise an attribute relationship between the two second vertexes; and determining the matched tracklet of the object to be tracked according to the matching scores.

In a third aspect, an embodiment of the present disclosure provides a training device for a multi-object tracking model comprising: a model constructing module for constructing an initial multi-object tracking model, wherein the multi-object tracking model comprises an object graph extraction network, a tracklet graph extraction network and a graph matching network; the object graph extraction network is configured for constructing an object graph according to objects to be tracked in a current video frame, the tracklet graph extraction network is configured for constructing a tracklet graph according to a tracked tracklets in a historical video frame, and the graph matching network is configured for performing graph matching on the object graph and the tracklet graph to predict a matched tracklet of the object to be tracked; wherein the object graph and the tracklet graph comprise vertexes and edges connecting the vertexes, the vertexes of the object graph correspond to the objects to be tracked, the vertexes of the tracklet graph correspond to the tracked tracklets, and the edge features of the edges of the two vertexes in the object graph and the tracklet graph comprise an attribute relationship between the two vertexes; and a model training module for performing joint training on networks in the multi-object tracking model according to a real matched tracklet and a predicted matched tracklet of the object to be tracked in training samples by adopting a preset loss function of the multi-object tracking model to obtain the trained multi-object tracking model.

In a fourth aspect, an embodiment of the present disclosure provides a multi-object tracking device comprising: an object graph constructing module for constructing an object graph according to objects to be tracked in a current video frame, wherein the object graph comprises first vertexes and first edges connecting the first vertexes, the first vertexes of the object graph correspond to the objects to be tracked, and the edge features of the first edges between the two first vertexes comprise an attribute relationship between the two first vertexes; a graph matching module for performing graph matching on the object graph and a tracklet graph to calculate matching scores between the object to be tracked and tracked tracklet in the tracklet graph, wherein the tracklet graph comprises second vertexes and second edges connecting the second vertexes, the second vertexes of the tracklet graph correspond to tracked tracklets, and the edge features of the second edges between the two second vertexes comprise an attribute relationship between the two second vertexes; and a track determining module for determining the matched tracklet of the object to be tracked according to the matching scores.

In a fifth aspect, an embodiment of the present disclosure provides a computing device comprising: one or more processors; a storage device for storing one or more programs; the one or more processors, when executing the one or more programs, implement the training method for a multi-object tracking model in the first aspect or implement the multi-object tracking method in the second aspect.

In a sixth aspect, an embodiment of the present disclosure provides a computer-readable storage medium having a computer program stored thereon, wherein the program, when executed by a processor, implements the training method for a multi-object tracking model in the first aspect or implements the multi-object tracking method in the second aspect.

The training method for a multi-object tracking model and the multi-object tracking method provided by the embodiment of the present disclosure have determined the tracked tracklets and constructed the corresponding tracklet graph for historical video frame when tracking the tracklets of objects to be tracked in the current video frame, each vertex of the tracklet graph corresponds to each tracked tracklet, the edge features of the edges between two vertexes comprise an attribute relationship between the two vertexes; then an object graph is constructed according to the objects to be tracked in the current video frame, each vertex in the object graph corresponds to each object to be tracked, the edge features of the edges between the two vertexes comprise an attribute relationship between the two vertexes; then graph matching is performed on the object graph and the tracklet graph to calculate the matching scores between each object to be tracked and tracked tracklets in the tracklet graph, so that the matched tracklet of each object to be tracked is determined, and the accurate video multi-object tracking is realized.

The edge features in the object graph and the tracklet graph are fully referenced during graph matching, which prevents tracking failure when a certain object is occluded, avoids the limitations of video multi-object tracking, and improves the robustness of video multi-object tracking. Meanwhile, if multi-object tracking is realized through the multi-object tracking model, it is required to first train the multi-object tracking model, and the initially constructed multi-object tracking model comprises an object graph extraction network, a tracklet graph extraction network and a graph matching network, which are configured for executing object graph construction, tracklet graph construction and graph matching in the multi-object tracking process, respectively; the corresponding preset loss function is set for the multi-object tracking model, and joint training is performed on networks in the multi-object tracking model according to a real matched tracklet of each object to be tracked in training samples and the obtained matched tracklet predicted by the multi-object tracking model by adopting the preset loss function to obtain the trained multi-object tracking model without specially performing separate training on the networks in the multi-object tracking model, which improves the association among the networks in the multi-object tracking model and the accuracy of multi-object tracking.

DETAILED DESCRIPTION

Figure 1A:
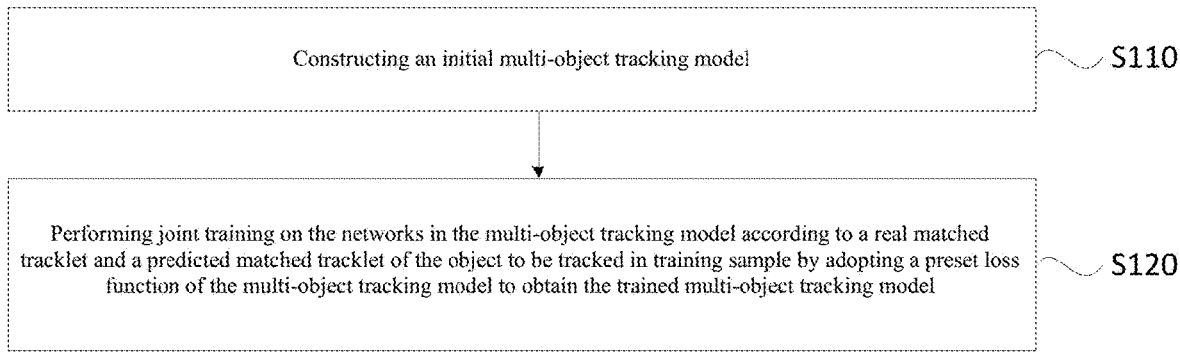
FIG. 1A is a flowchart of the training method for a multi-object tracking model according to embodiment I of the present disclosure.
Figure 1B:
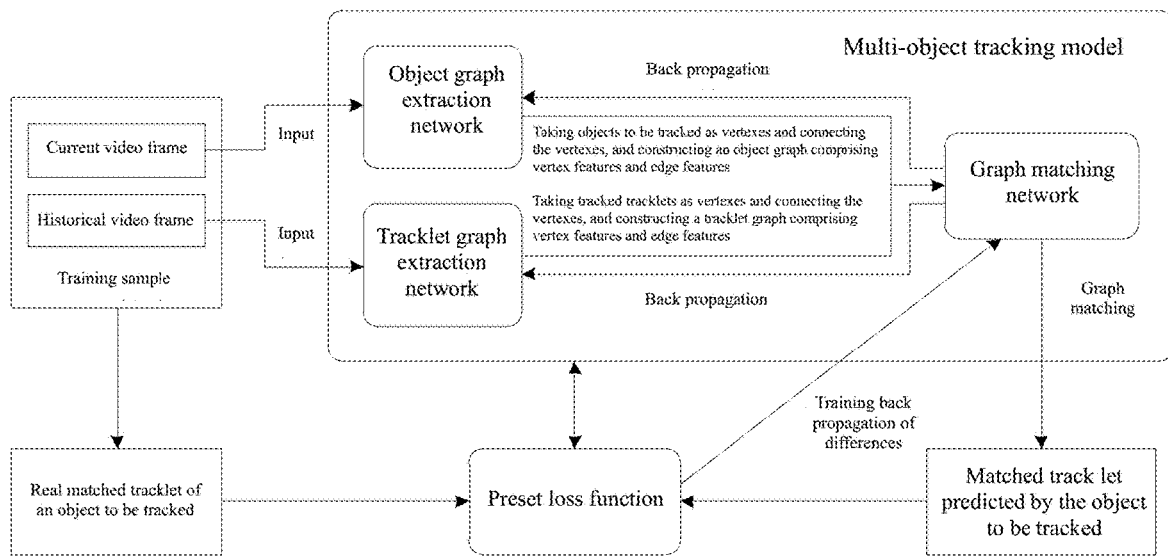
FIG. 1B is a schematic diagram of the principle of the training process of the multi-object tracking model according to embodiment I of the present disclosure.

The present document will be further described in detail with reference to the drawings and embodiments. It will be appreciated that the specific embodiments described herein are merely illustrative of the present disclosure and are not to be construed as limiting the present disclosure. It should be further noted that, for the convenience of description, only some, but not all, structures associated with the present disclosure are shown in the drawings. In addition, the embodiments and features thereof in the present disclosure may be combined with one another without conflict.

Some implementations of the disclosed technology provide more robust multi-object tracking method. The conventional multi-object tracking algorithm has certain limitations, for example, if a certain object is occluded or there are too many objects, the tracklet of the object cannot be accurately matched. Some implementations of the disclosed technology address the lack of robustness of the conventional video multi-object tracking algorithm.

Embodiment I

FIG. 1A is a flowchart of the training method for a multi-object tracking model according to embodiment I of the present disclosure, embodiment I may be applicable to the case of performing multi-object tracking on any video, and the training method for the multi-object tracking model provided by embodiment I may be performed by the training device for a multi-object tracking model provided by an embodiment of the present disclosure, and the training device may be implemented by software and/or hardware and is integrated into a computing device for performing the training method.

Specifically, referring to FIG. 1A, the method may comprise the following steps.

In S110, an initial multi-object tracking model is constructed.

Specifically, in order to realize accurate multi-object tracking in a video, a neural network model is usually trained to continuously perform corresponding multi-object tracking on video frames, so that the trained neural network model can accurately output the matched tracklets of the tracked objects in any video frame. When multi-object tracking is performed on any video frame in a certain video, the video frames may be divided into a current video frame requiring multi-object tracking and a historical video frame already completing multi-object tracking, which means that there are a plurality of objects to be tracked in the current video frame. The object may be tracked in the historical video frame by analyzing the position of each object in different historical video frames, and therefore, a plurality of tracked tracklets are determined. Performing multi-object tracking on the current video frame is to match the objects to be tracked in the current video frame with the tracked tracklets in the historical video frame so as to determine the matched tracklet of each object to be tracked from the tracked tracklets.

In embodiment I, for objects to be tracked in a current video frame, each object to be tracked is taken as a vertex, and then vertexes are connected to construct a corresponding object graph, wherein the object graph comprises vertexes and edges connecting the vertexes, each vertex in the object graph corresponds to each object to be tracked in the current video frame, and the vertex features of each vertex are attribute features of the object to be tracked corresponding to the vertex. The attribute features may comprise various features capable of describing unique features of the object to be tracked in the current video frame, such as appearance features, geometric features and tracklet speed of the object to be tracked, and the edge features of the edge connecting two vertexes in the object graph may comprise an attribute relationship between the two vertexes, that is, a relationship between the attribute features of the two vertexes.

For the tracked tracklet in the historical video frame, each tracked tracklet is also taken as a corresponding vertex and then vertexes are connected to construct a corresponding tracklet graph; the tracklet graph also comprises the vertexes and edges connecting the vertexes, each vertex in the tracklet graph corresponds to each tracked tracklet which is tracked in the historical video frame, the tracked tracklet is formed by connecting the positions of the same object in different historical video frames, the vertex features of each vertex in the tracklet graph are the attribute features of the tracked tracklet corresponding to the vertex, and the attribute features of the tracked tracklet may be obtained by fusing the attribute features of each object corresponding to the tracked tracklet in different historical video frames, for example, the attribute features of the tracked tracklet may be obtained by averaging the attribute features of each object corresponding to each tracked tracklet in different historical video frames, moreover, the edge features of the edge connecting the two vertexes in the tracklet graph may also comprise an attribute relationship between the two vertexes, that is, a relationship between the attribute features of the two vertexes.

Each object to be tracked in the current video frame can be fully described through the vertex features and the edge features in the object graph, and each tracked tracklet in the historical video frame can also be fully described through the vertex features and the edge features in the tracklet graph, so that the matched tracklet of each object to be tracked may be determined from the tracked tracklets by performing graph matching on the object graph and the tracklet graph.

The steps performing the video multi-object tracking in embodiment I mainly comprises: constructing an object graph of objects to be tracked in the current video frame, constructing a tracklet graph of tracked tracklets in the historical video frame, and performing graph matching on the object graph and the tracklet graph. Therefore, in order to ensure the accuracy of each step in the video multi-object tracking, when an initial multi-object tracking model is constructed in embodiment I, a corresponding object graph extraction network, a corresponding tracklet graph extraction network and a corresponding graph matching network may be set in the multi-object tracking model. The object graph extraction network is configured for constructing an object graph according to objects to be tracked in a current video frame, the tracklet graph extraction network is configured for constructing a tracklet graph according to tracked tracklets in a historical video frame, and the graph matching network is configured for performing graph matching on the object graph and the tracklet graph to predict the matched tracklet of each object to be tracked from the tracked tracklets, so that each network in the multi-object tracking model can specially perform a certain corresponding specific step in the video multi-object tracking process, thus ensuring the accuracy of the video multi-object tracking.

The object to be tracked in embodiment I may be an object whose position may change constantly in different frames of a certain video, such as a pedestrian, a vehicle and an animal that need to be tracked, which is not limited to this, and the objects to be tracked may be identified from the current frame through a specific object detection algorithm. Meanwhile, in order to ensure efficient and convenient use of the vertex features and the edge features in the object graph and the tracklet graph in a subsequent graph matching process, the attribute features of the vertexes of the object graph and the tracklet graph in embodiment I may be represented as vector features, and the edge features of the edges between the two vertexes may also be represented as concatenated vectors or weighted vectors of the vector features corresponding to the two vertexes.

In addition, in order to ensure comprehensiveness of the referenced features when performing graph matching on the object graph and the tracklet graph, both the object graph and the tracklet graph may be set as complete graphs in embodiment I, that is, one edge may be connected between every two vertexes of the object graph and the tracklet graph to associate the object to be tracked corresponding to every two vertexes in the object graph or the tracked tracklet corresponding to every two vertexes in the tracklet graph, so as to accurately perform graph matching on the object graph and the tracklet graph in the following steps. Certainly, those skilled in the art may set the object graph and the tracklet graph as incomplete graphs as desired, that is, no edge connection between some vertexes is allowed.

In S120, joint training is performed on networks in the multi-object tracking model according to a real matched tracklet and a predicted matched tracklet of the object to be tracked in training samples by adopting a preset loss function of the multi-object tracking model to obtain the trained multi-object tracking model.

Optionally, after the initial multi-object tracking model is constructed, it is required to perform multi-object tracking training on the multi-object tracking model, so that the multi-object tracking model can accurately perform tracklet tracking on objects to be tracked in any video. When the constructed multi-object tracking model is trained, a corresponding preset loss function is firstly set for the multi-object tracking model, and the difference between a prediction result and a real result after multi-object tracking in the current training process is determined through the preset loss function so as to continuously adjust various model parameters in the multi-object tracking model.

In some implementations, a large number of historical videos containing multi-object tracking contents are obtained as training samples of the multi-object tracking model, a real matched tracklet of each object to be tracked in each video frame in the training sample for each training sample is marked, so that the difference between a real matched tracklet and a predicted matched tracklet of each object to be tracked is compared through the preset loss function after the matched tracklets of the objects to be tracked in each video frame in the training sample is continuously predicted in the model training process, so as to adjust the multi-object tracking model. That is, each object has its corresponding tracked tracklet in the historical video, each frame in the historical video may be used as a current frame, and each current frame is marked with matched tracklets between the objects and the tracked tracklets of the historical video.

A corresponding object graph is constructed by inputting a current frame in a training sample into an object graph extraction network in the constructed multi-object tracking model, identifying objects to be tracked in the current video frame through the object graph extraction network, detecting attribute features of the objects to be tracked, taking the objects to be tracked as vertexes and connecting the vertexes. Besides, the vertex features of vertexes in the object graph are determined, and the edge features of edges connecting the two vertexes according to an attribute relationship between the two vertexes are determined for use in a subsequent graph matching.

Historical video frames in the training samples are inputted into the tracklet graph extraction network in the constructed multi-object tracking model. Each historical video frame has already completed multi-object tracking, that is, tracked tracklets constructed after a plurality of same objects are tracked in different historical video frames can be identified through the tracklet graph extraction network, and the attribute features of the tracked tracklet corresponding to the object are obtained by performing feature fusion (such as feature mean value processing) on the attribute features of the same object in historical video frames. Then a corresponding tracklet graph is constructed by taking the tracked tracklets as vertexes and connecting the vertexes. Also, the vertex features of vertexes in the tracklet graph are determined, and the edge features of edges connecting the two vertexes according to an attribute relationship between the two vertexes are determined for use in a subsequent graph matching.

Then, the object graph and the tracklet graph are inputted into the graph matching network in the constructed multi-object tracking model, and the vertex similarity and the edge similarity between the object graph and the tracklet graph are calculated by the graph matching network according to the vertex features of the vertexes and the edge features of each edge in the object graph and the tracklet graph. Because the vertexes in the object graph correspond to the objects to be tracked and the vertexes in the tracklet graph correspond to the tracked tracklets, the matched tracklet of each object to be tracked is determined from the tracked tracklets, that is, the vertexes in the object graph are matched with the vertexes in the tracklet graph. Therefore, for each vertex in the object graph, the graph matching network may comprehensively analyze the overall matching degree between the vertex and vertexes in the tracklet graph according to the vertex features of the vertexes in the object graph and the edge features of edges related to the vertex, and the vertex features of vertexes in the tracklet graph and the edge features of edges related to vertexes in the tracklet graph. Even if a certain vertex in the object graph is partially occluded, the matching degree between the vertex and vertexes in the tracklet graph can be analyzed through the related edge features, so that tracking failure when a certain object is occluded is prevented, and the limitations of video multi-object tracking are avoided.

Thus, the graph matching network can predict the matched tracklet of each object to be tracked in the current frame of the training sample from tracked tracklets in the historical video frame in the training sample. Then a real matched tracklet of each object to be tracked in the training sample and the matched tracklet predicted by the object to be tracked are substituted into a preset loss function of the multi-object tracking model. The difference between the matched tracklet predicted in the current training process and the real matched tracklet is analyzed through the preset loss function, and the difference is back-propagated in the graph matching network, the tracklet graph extracting network and the object graph extracting network in the multi-object tracking model according to the backward flow of the multi-object tracking process to synchronously correct various network parameters in the graph matching network, the tracklet graph extracting network and the object graph extracting network, which leads the difference between the matched tracklet predicted in the current training process and the real matched tracklet to be converged continuously. Thus the joint training is performed on networks in the multi-object tracking model and the trained multi-object tracking model is finally obtained, improving the association among networks in the multi-object tracking model and the accuracy of multi-object tracking.

In the technical scheme provided by embodiment I, if multi-object tracking is realized through the multi-object tracking model, it is required to first train the multi-object tracking model, and the initially constructed multi-object tracking model comprises an object graph extraction network, a tracklet graph extraction network and a graph matching network, which are configured for executing object graph construction, tracklet graph construction and graph matching in the multi-object tracking process, respectively. The corresponding preset loss function is set for the multi-object tracking model, and joint training is performed on networks in the multi-object tracking model according to a real matched tracklet of each object to be tracked in training samples and the obtained matched tracklet predicted by the multi-object tracking model by adopting the preset loss function to obtain the trained multi-object tracking model without specially performing separate training on the networks in the multi-object tracking model, which improves the association among the networks in the multi-object tracking model and the accuracy of multi-object tracking.

Embodiment II

Figure 2A:
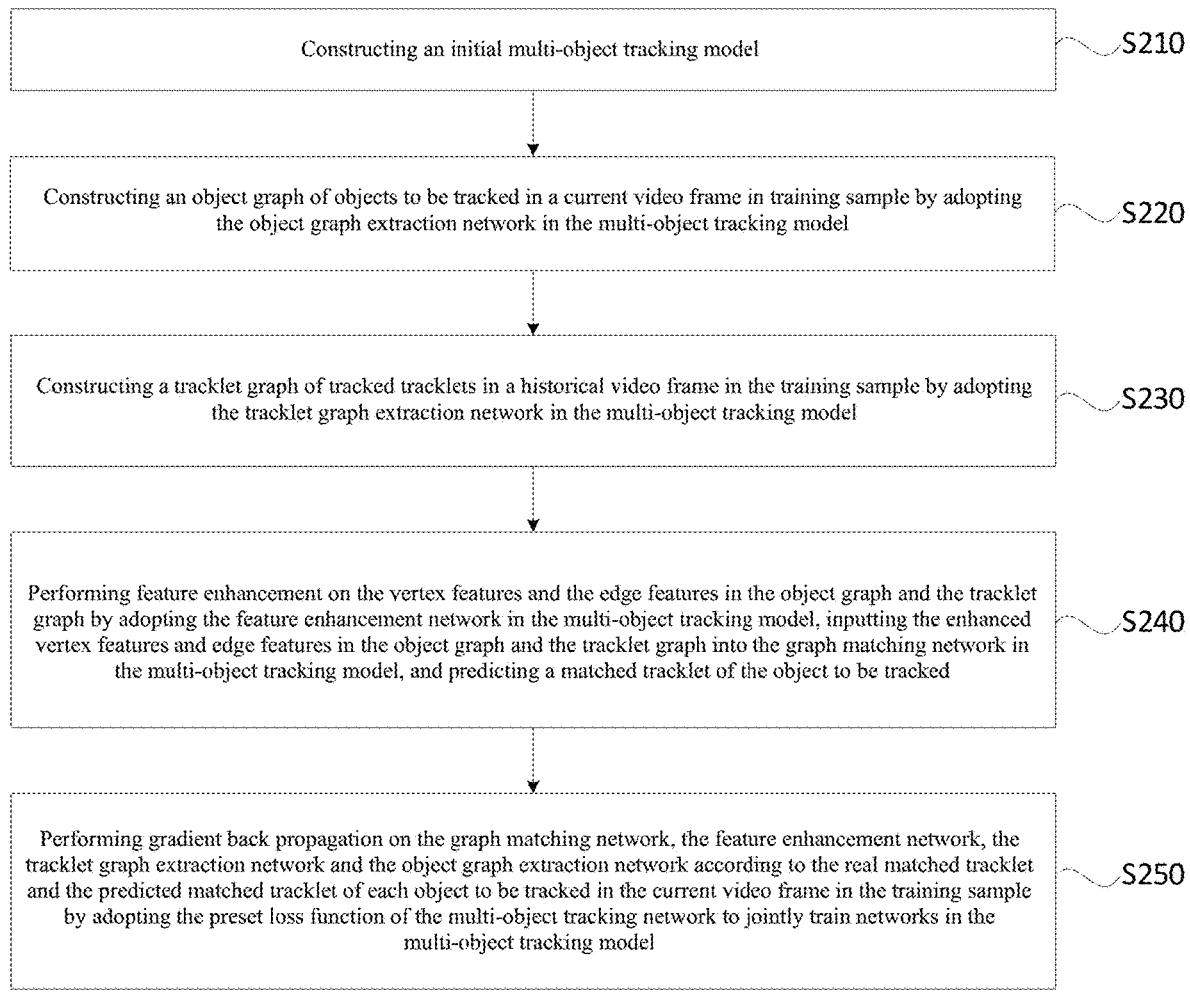
FIG. 2A is a flowchart of the training method for a multi-object tracking model according to embodiment II of the present disclosure.
Figure 2B:
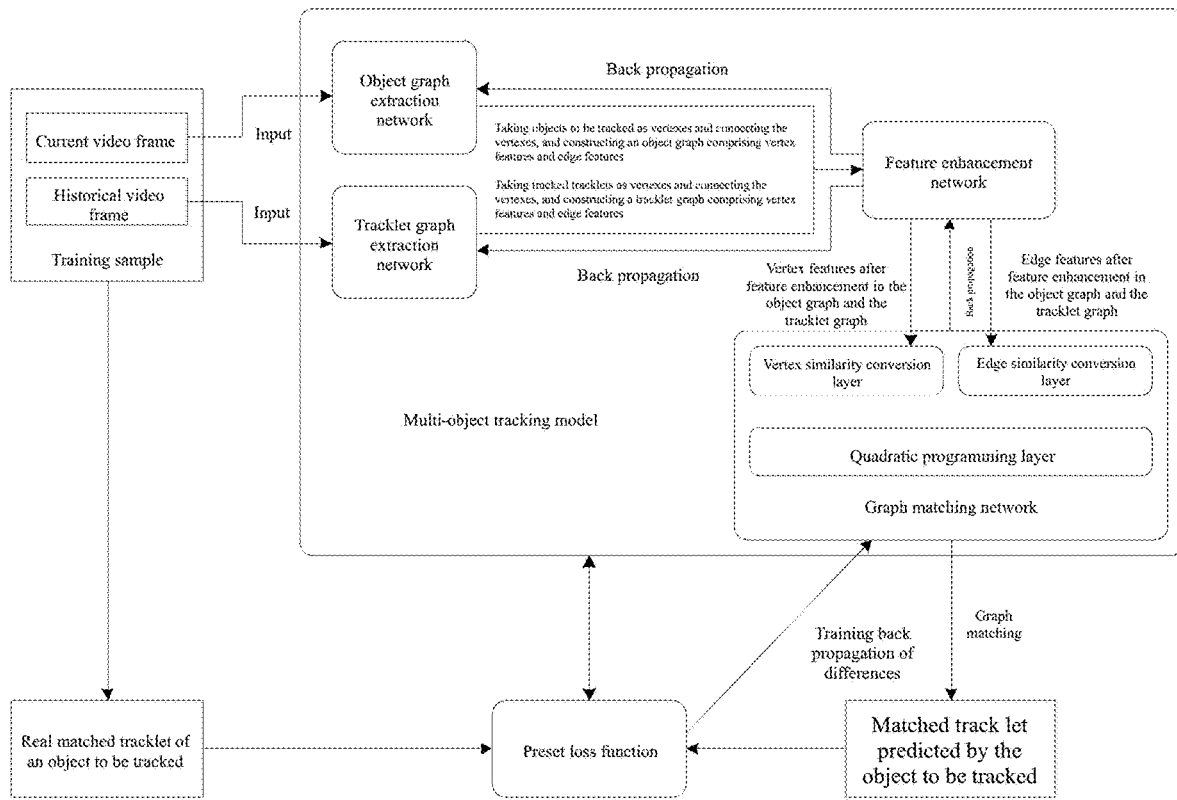
FIG. 2B is a schematic diagram of the principle of the specific training process of the multi-object tracking model in the method according to embodiment II of the present disclosure.

FIG. 2A is a flowchart of the training method for a multi-object tracking model according to embodiment II of the present disclosure, and FIG. 2B is a schematic diagram of the principle of the specific training process of the multi-object tracking model in the method according to embodiment II of the present disclosure. Embodiment I is optimized based on the above embodiment. Specifically, as shown in FIG. 2B, based on the above technical scheme, in order to improve the accuracy of the graph matching network performing the graph matching on the object graph and the tracklet graph according to the vertex similarity and the edge similarity between the object graph and the tracklet graph; in embodiment II, when the initial multi-object tracking model is constructed, a feature enhancement network is additionally set in the multi-object tracking model, the feature enhancement network is configured for performing feature enhancement on the vertex features and the edge features in the constructed object graph and tracklet graph after constructing an object graph of objects to be tracked in a current video frame through the object graph extraction network and after constructing a tracklet graph of the tracked tracklets in a historical video frame by the tracklet graph extraction network, so that the graph matching network performs graph matching on the object graph and the tracklet graph according to the enhanced vertex features and the edge features in the object graph and the tracklet graph.

As shown in FIG. 2B, embodiment II may comprise the following steps:

In S210, an initial multi-object tracking model is constructed.

In S220, an object graph of objects to be tracked in a current video frame in training samples is constructed by adopting the object graph extraction network in the multi-object tracking model.

Optionally, a corresponding object graph is constructed by inputting a current video frame in a training sample into an object graph extraction network in the constructed multi-object tracking model, identifying objects to be tracked in the current video frame through the object graph extraction network, detecting attribute features of the objects to be tracked, taking the objects to be tracked as vertexes and connecting the vertexes. And the vertex features of vertexes in the object graph are determined, and the edge features of edges connecting the two vertexes according to an attribute relationship between the two vertexes are determined.

In S230, a tracklet graph of tracked tracklets in a historical video frame in the training samples is constructed by adopting the tracklet graph extraction network in the multi-object tracking model.

Optionally, the historical video frame in the training samples are inputted into the tracklet graph extraction network in the constructed multi-object tracking model to obtain attribute features of the tracked tracklet corresponding to the object, and then a corresponding tracklet graph is constructed by taking tracked tracklets as vertexes and connecting the vertexes. And the vertex features of vertexes in the tracklet graph are determined, and the edge features of edges connecting the two vertexes according to an attribute relationship between the two vertexes are determined.

In S240, feature enhancement is performed on the vertex features and the edge features in the object graph and the tracklet graph by adopting the feature enhancement network in the multi-object tracking model, inputting the enhanced vertex features and edge features in the object graph and the tracklet graph into the graph matching network in the multi-object tracking model, and predicting a matched tracklet of the object to be tracked.

In embodiment II, in order to further improve the matching accuracy between the vertexes in the object graph and the tracklet graph, the vertex features of the vertexes and the edge features of the edges connecting the two vertexes in the object graph and the tracklet graph are firstly inputted into a feature enhancement network in the multi-object tracking model, and the feature similarities between each vertex in the object graph and vertexes in the tracklet graph are analyzed by the feature enhancement network for the vertex features of each vertex in the object graph. Then the feature similarity is taken as the weight between a vertex in the object graph and vertexes in the tracklet graph, and the vertex feature of the vertex after feature enhancement is obtained by weighting and fusing the vertex features of vertexes in the tracklet graph into the vertex feature of the vertex based on the weight between the vertex in the object graph and vertexes in the tracklet graph.

For example, if a vertex feature of a certain vertex in the object graph is $h_i$, and the vertex features of vertexes in the tracklet graph are $h_{j,1}, h_{j,2}, \ldots, h_{j,n}$, wherein n is the number of vertexes in the tracklet graph, the feature similarities $w_{i,j1}, w_{i,j2}, \ldots, w_{i,jn}$ between the vertex features of each vertex in the tracklet graph and the vertex feature of the vertex in the object graph may be calculated.

The vertex feature of the vertex in the object graph after feature enhancement may be $h_i' = h_i + w_{i,j1} \cdot h_{j,1} + w_{i,j2} \cdot h_{j,2} + \ldots + w_{i,jn} \cdot h_{j,n}$, so that the vertex feature of a certain vertex after feature enhancement are more similar to those of similar vertex in the tracklet graph, and are more easily distinguished from those of dissimilar vertex in the tracklet graph. According to the same steps, the feature weighting result of each vertex in the tracklet graph may be adopted to perform feature enhancement on the vertex feature of each vertex in the object graph by calculating the feature similarity between each vertex in the object graph and each vertex in the tracklet graph. Meanwhile, for the vertex feature of each vertex in the tracklet graph, the above enhancement mode of the vertex features in the object graph may be adopted, the feature similarity between the vertex in the tracklet graph and vertexes in the object graph is analyzed to serve as the corresponding weight, and the vertex features of vertexes in the object graph are weighted and fused into the vertex feature of the vertex in the tracklet graph by adopting the weight between the vertex and vertexes in the object graph, so that the vertex feature of the vertex in the tracklet graph after feature enhancement are obtained.

In one implementation, the enhanced vertex features may be directly concatenated or weighted as the enhanced edge features.

In another implementation, for the edge features of each edge in the object graph and the tracklet graph, feature similarity between the edge features of each edge in the object graph and the edge features of each edge in the tracklet graph may also be calculated as weight between each edge in the object graph and each edge in the tracklet graph in the same manner as vertex feature enhancement provided above. Then the edge features of each edge in the tracklet graph are weighted and fused into the edge feature of the edge in the object graph, or the edge features of each edge in the object graph are weighted and fused into the edge features of the edge in the tracklet graph by adopting the weight, so as to perform feature enhancement on the edge feature of each edge in the object graph and the tracklet graph, and obtain the edge feature of each edge in the object graph and the tracklet graph after feature enhancement. Subsequently, after the vertex features and the edge features after feature enhancement in the object graph and the tracklet graph are adopted through the graph matching network to calculate the vertex similarity and the edge similarity between the object graph and the tracklet graph, the matched tracklet of each object to be tracked can be more accurately predicted.

As an alternative to the weight calculation in the above embodiment, embodiment II may calculate the weight between vertexes in the object graph and vertexes in the tracklet graph or calculate the weight between edges in the object graph and edges in the tracklet graph by adopting the formula: $w_{i,j}=\cos(h_i,h_j)+IoU(g_i,g_j)$. If the weight between the vertexes in the object graph and the tracklet graph is calculated, $h_i$ is a vertex feature of a certain vertex in the object graph, $h_j$ is a vertex feature of a certain vertex in the tracklet graph, $g^i$ is the size of a detection bounding box of the object to be tracked in the current video frame corresponding to the vertex in the object graph, $g_j$ is the size of a detection bounding box of a related object of the tracked tracklet in the historical video frame corresponding to the vertex in the tracklet graph, $\cos(h_i,h_j)$ represents the feature similarity between the vertex in the object graph and the vertex in the tracklet graph, and $IoU(g_i,g_j)$ represents the coincidence proportion of the detection bounding box between the vertexes in the object graph and the tracklet graph, that is, the proportion of intersection and union of the detection bounding box. If the weight between the edges in the object graph and the tracklet graph is calculated, $h_i$ is an edge feature of a certain edge in the object graph, $h_j$ is an edge feature of a certain edge in the tracklet graph, $g^i$ is the size of a detection bounding box of the object to be tracked in the current video frame corresponding to the two vertexes connected with the edge in the object graph, $g_j$ is the size of a detection bounding box of a related object of the tracked tracklet in the historical video frame corresponding to the two vertexes connected with the edge in the tracklet graph, $\cos(h_i,h_j)$ represents the feature similarity between the edge in the object graph and the edge in the tracklet graph, and $IoU(g_i,g_j)$ represents the coincidence proportion of the detection bounding boxs between the two vertexes connected with the edge in the object graph and the tracklet graph, that is, the proportion of intersection and union of the two detection bounding boxs, so that the accuracy of the selected weight during feature enhancement is ensured, and the feature enhancement accuracy of the vertex features and the edge features in the object graph and the tracklet graph is further improved.

It should be noted that the feature enhancement network in embodiment II may be a graph neural network having a feature aggregation and enhancement function, such as a cross-graph convolutional network or an information transfer network.

After the enhanced vertex features and edge features in the object graph and the tracklet graph are inputted into the graph matching network in the multi-object tracking model, the graph matching network may calculate vertex similarity and edge similarity between the object graph and the tracklet graph according to the enhanced vertex features and edge features, calculate the matching scores between the object to be tracked in the object graph and the tracked tracklet in the tracklet graph according to the vertex similarity and the edge similarity, and predict the matched tracklet of the object to be tracked according to the matching scores. Specifically, the graph matching network firstly adopt the corresponding enhanced vertex features and edge features for each vertex and each edge in the object graph, respectively, and adopt the vertex features of vertexes and the edge features of edges in the tracklet graph, to calculate the vertex similarity between each vertex in the object graph and vertexes in the tracklet graph, and the edge similarity between each edge in the object graph and edges in the tracklet graph. Then, for the corresponding vertex of each object to be tracked in the object graph, the matching degree between vertexes in the object graph and vertexes in the tracklet graph by analyzing the vertex similarity between the vertex and vertexes in the tracklet graph and the edge similarity between each edge connecting the vertex in the object graph and edges in the tracklet graph, thereby obtaining the matching score between the object to be tracked in the object graph and the tracked tracklet in the tracklet graph. Then the matched tracklet of each object to be tracked from the tracked tracklets by finding out the highest matching score between each object to be tracked and the tracked tracklets.

Based on the above technical scheme, as shown in FIG. 2B, the graph matching network in embodiment II is composed of a vertex similarity conversion layer, an edge similarity conversion layer and a quadratic programming layer. The vertex similarity conversion layer is configured for calculating vertex similarity between the object graph and the tracklet graph and performing dimension conversion, the edge similarity conversion layer is configured for calculating edge similarity between the object graph and the tracklet graph and performing dimension conversion, and the quadratic programming layer is configured for calculating the matching scores using the vertex similarity and the edge similarity after dimension conversion based on a quadratic programming problem.

After the vertex features of each vertex and the edge features of each edge in the object graph, and the vertex features of each vertex and the edge features of each edge in the tracklet graph are inputted into the graph matching network, the vertex similarity conversion layer in the graph matching network analyzes the feature similarity between each vertex in the object graph and vertexes in the tracklet graph, and therefore, the vertex similarity between the object graph and the tracklet graph is calculated. The vertex similarity is a $m_1 \times n_1$ matrix, wherein $m^1$ is the number of vertexes in the object graph, $n_1$ is the number of vertexes in the tracklet graph. The edge similarity conversion layer in the graph matching network analyzes the feature similarity between each edge in the object graph and edges in the tracklet graph to calculate the edge similarity between the object graph and the tracklet graph, wherein the edge similarity is a $m_2 \times n_2$ matrix, $m_2$ is the number of edges in the object graph, and $n_2$ is the number of edges in the tracklet graph. Because the dimensions of the vertex similarity and the edge similarity between the object graph and the tracklet graph are different, the vertex similarity and the edge similarity cannot be quickly fused when calculating matching score between the object graph and the tracklet graph according to the vertex similarity and the edge similarity. Therefore, in embodiment II, dimension conversion is performed on the vertex similarity between the object graph and the tracklet graph through the vertex similarity conversion layer, and dimension conversion is performed on the edge similarity between the object graph and the tracklet graph through the edge similarity conversion layer, so that the vertex similarity and the edge similarity after dimension conversion can be accurately and efficiently fused. Moreover, the number of edges in the object graph and the tracklet graph is specifically determined by the number of vertexes in the object graph and the tracklet graph, so that the vertex similarity conversion layer and the edge similarity conversion layer set corresponding conversion dimensions according to the number of vertexes in the object graph and the tracklet graph.

Furthermore, the quadratic programming layer can relaxation-adjust the discrete allocation object in the quadratic allocation problem used in the original graph matching process to be a corresponding continuous programming object in advance, and then correspondingly convert the adjusted quadratic allocation problem to obtain a corresponding quadratic programming problem, so that the quadratic programming layer has differentiable and learnable functions for the subsequent training of the neural network. Illustratively, the quadratic programming problem in the quadratic programming layer may be $$X^* = \underset{x \in D'}{\mathrm{argmax}} x^T((n-1)^2 I - M)x - b^T x;$$

wherein D' is a continuous programming object after the relaxation adjustment, M is the edge similarity after the dimension conversion, b is the vertex similarity after the dimension conversion, and X* is the matching score between the object to be tracked in the object graph and the tracked tracklet in the tracklet graph. The quadratic programming layer substitutes the vertex similarity and the edge similarity after dimension conversion into the quadratic programming problem, so that the matching score between each object to be tracked in the object graph and tracked tracklets in the tracklet graph may be calculated, and the matched tracklet of each object to be tracked is predicted in tracked tracklets through the matching score.

In S250, gradient back propagation is performed on the graph matching network, the feature enhancement network, the tracklet graph extraction network and the object graph extraction network according to the real matched tracklet and the predicted matched tracklet of each object to be tracked in the current video frame in the training samples in the historical video frame by adopting the preset loss function of the multi-object tracking network to jointly train networks in the multi-object tracking model.

Optionally, after the matched tracklet of each object to be tracked is predicted, the real matched tracklets of objects to be tracked in the training sample are found out, and then the real matched tracklet and the predicted matched tracklet of each object to be tracked are substituted into the preset loss function of the multi-object tracking model, so as to analyze the difference between the predicted matched tracklet and the real matched tracklet under the current training. The preset loss function in embodiment II may be a weighted binary cross entropy loss function, and weights in the preset loss function are set according to the number of vertexes in the object graph and the tracklet graph, as shown in the formula $$\zeta = \frac{-1}{n_d n_t} \sum_{i=1}^{n_d} \sum_{j=1}^{n_t} k y_{i,j} \log(y'_{i,j}) + (1 - y_{i,j})\log(1 - y'_{i,j});$$

wherein k is the weight in the preset loss function, $y_{i,j}$ is the real matching score of the object to be tracked, and $y'_{i,j}$ is the predicted matching score of the object to be tracked. After the difference between the matched tracklet predicted by the object to be tracked and the real matched tracklet is calculated through the preset loss function, then the difference is gradient back-propagated in the graph matching network, the tracklet graph extracting network and the object graph extracting network in the multi-object tracking model according to the backward tracking flow of the multi-object tracking process to synchronously correct various network parameters in the graph matching network, the tracklet graph extracting network and the object graph extracting network. Therefore, joint training is performed on networks in the multi-object tracking model, and the multi-object tracking model can accurately predict the matched tracklet of each object to be tracked.

In the technical scheme provided by embodiment II, the quadratic allocation problem used in the original graph matching process is converted into the quadratic programming problem, so that the graph matching network has differentiable and learnable functions, and therefore, joint training is performed on networks in the multi-object tracking model, and the association among the networks in the multi-object tracking model and the accuracy of multi-object tracking are improved.

Embodiment III

Figure 3:
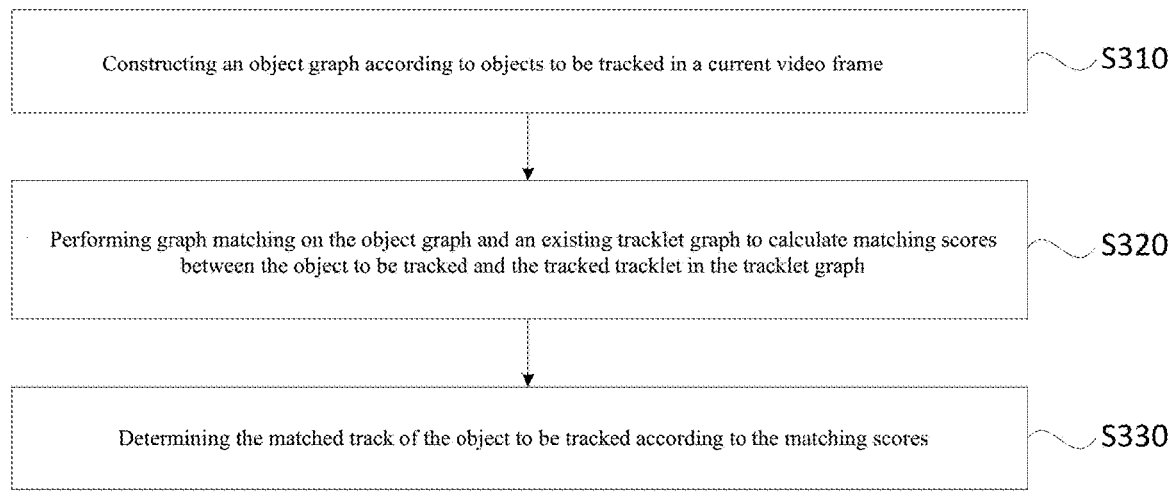
FIG. 3 is a flowchart of the multi-object tracking method according to embodiment III of the present disclosure.

FIG. 3 is a flowchart of the multi-object tracking method according to embodiment III of the present disclosure, and embodiment III may be applicable to the case of performing multi-object tracking on any video. The multi-object tracking method provided by embodiment III may be performed by the multi-object tracking device provided by an embodiment of the present disclosure. Specifically, the device may implement this method in a manner of software and/or hardware and is integrated in a computing device performing this method.

Referring to FIG. 3, the method may comprise the following steps.

In S310, an object graph is constructed according to objects to be tracked in a current video frame.

Specifically, in a video multi-object tracking scene, tracklet tracking can be sequentially performed on each object in each frame in the video, the video may be divided into a current frame on which multi-object tracking is performed and at least one historical frame already completing multi-object tracking, and a plurality of tracked tracklets may be determined by analyzing the completed multi-object tracking of the historical frames according to the tracking positions of the same object in historical frames. Multi-object tracking is performed on the current frame to match objects to be tracked in the current frame with tracked tracklets in the historical frame so as to determine the matched tracklet of each object to be tracked from tracked tracklets.

In embodiment III, objects to be tracked t may be identified from the current frame through a preset object detection algorithm, and then each object to be tracked is used as a corresponding vertex to connect vertexes, so as to construct a corresponding object graph. The object graph comprises vertexes and edges connecting the vertexes, each vertex in the object graph corresponds to each object to be tracked, so that the vertex features of each vertex in the object graph are the attribute features of the object to be tracked corresponding to the vertex, and the edge features of the edge between two vertexes in the object graph may comprise an attribute relationship between the two vertexes, that is, a relationship between the attribute features of the two vertexes, such as the distance, the appearance difference or the relative track speed of the object to be tracked corresponding to the two vertexes in the current video frame.

In some implementations, constructing the object graph according to the objects to be tracked in the current frame in embodiment III may be or include: extracting attribute features of each object to be tracked in the current frame, taking each object to be tracked as a vertex, constructing an object graph, and obtaining vertex features of each vertex in the object graph. Thus, the attribute features of the object to be tracked are obtained by analyzing various features (such as appearance features, geometric features and track speed) of each object to be tracked in the current video frame capable of describing unique features of the object to be tracked in the current video frame, then the object graph is constructed by taking each object to be tracked as a vertex and connecting vertexes, and vertex features of each vertex in the object graph are the attribute features of the object to be tracked corresponding to the vertex.

In S320, graph matching is performed on the object graph and an existing tracklet graph to calculate matching scores between the object to be tracked and the tracked tracklet in the tracklet graph.

When the multi-object tracking is performed on the current video frame, the historical video frames have already completed multi-object tracking, and the plurality of tracked tracklets may be determined according to the tracking positions of the same object in each historical video frame. Therefore, after the multi-object tracking of the historical video frame is completed, a corresponding tracklet graph is constructed by taking each tracked tracklet under the historical video frame as a corresponding vertex and connecting vertexes. The tracklet graph also comprises vertexes and edges connecting the vertexes, each vertex of the tracklet graph corresponds to each existing tracked tracklet, the tracked tracklet is formed by connecting positions of the same object in different historical video frames, vertex features of each vertex in the tracklet graph are the attribute features of the tracked tracklet corresponding to the vertex, the attribute features are obtained by fusing the attribute features of the objects corresponding to the tracked tracklet in historical video frames, and the edge features of the edge between two vertexes in the tracklet graph may also comprise an attribute relationship between the two vertexes, that is, a relationship between the attribute features of the two vertexes.

It should be noted that both the object graph and the tracklet graph may be set as incomplete graphs and complete graphs in embodiment III, and the complete graph means that one edge may be connected between every two vertexes of the object graph and the tracklet graph, so as to associate the object to be tracked corresponding to every two vertexes in the object graph or the tracked tracklet corresponding to every two vertexes in the tracklet graph, so as to accurately perform graph matching on the object graph and the tracklet graph in the following steps.

The matching degree between each vertex in the object graph and each vertex in the tracklet graph can be analyzed by performing graph matching on the object graph and the tracklet graph to calculate matching scores between each object to be tracked in the object graph (i.e., each vertex in the object graph) and tracked tracklets in the tracklet graph (i.e., vertexes in the tracklet graph), so as to predict the matched tracklet of each object to be tracked from the tracked tracklets in the following steps according to the matching score.

In S330, the matched tracklet of the object to be tracked is determined according to the matching scores.

Optionally, after the matching scores between each object to be tracked in the object graph and tracked tracklets in the tracklet graph is calculated, the tracked tracklet with the highest matching score with the object to be tracked can be found out for each object to be tracked, the tracked tracklet found out is taken as the matched tracklet of the object to be tracked, and the matched tracklet of each object to be tracked may be determined according to the above steps.

In order to ensure the accuracy of subsequent multi-object tracking, after the matched tracklet of each object to be tracked in the current frame is determined according to the matching scores, the tracklet graph is updated according to the matched tracklet of the object to be tracked in the current frame, and vertex features of each vertex in the tracklet graph is updated according to the attribute features of the matched tracklets of objects to be tracked in the current video frame. That is, a corresponding tracklet graph is reconstructed by taking tracked tracklets redetermined after the current video frame completes multi-object tracking as vertexes, the attribute features of the tracked tracklets determined by the matched tracklets of objects to be tracked in the current video frame are redetermined by analyzing the attribute features of the objects to be tracked in the current video frame, so that the vertex features of vertexes in the tracklet graph are correspondingly updated, and the accuracy of the subsequent video frame in multi-object tracking is ensured.

In the technical scheme provided by embodiment III, before the tracklets of objects to be tracked in the current video frame are tracked, the tracked tracklets have been determined for the historical video frame, and the corresponding tracklet graph has been constructed; each vertex of the tracklet graph corresponds to each existing tracked tracklet, and the edge features of the edge between the two vertexes comprise an attribute relationship between the two vertexes. An object graph is constructed according to objects to be tracked in the current video frame, then graph matching is performed on the object graph and the tracklet graph to calculate matching scores between each object to be tracked and tracked tracklets in the tracklet graph, so that the matched tracklet of each object to be tracked is determined, and accurate video multi-object tracking is realized.

Embodiment IV

Figure 4A:
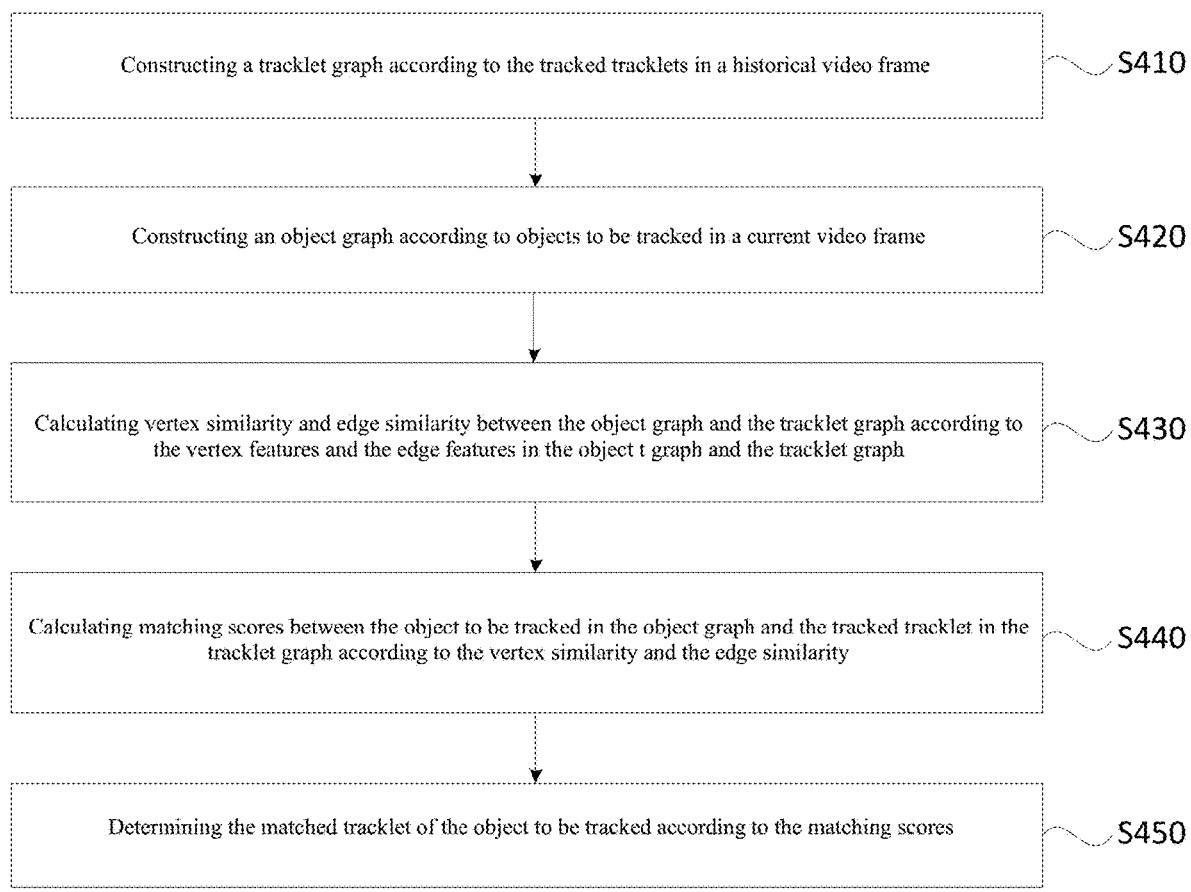
FIG. 4A is a flowchart of the multi-object tracking method according to embodiment IV of the present disclosure.
Figure 4B:
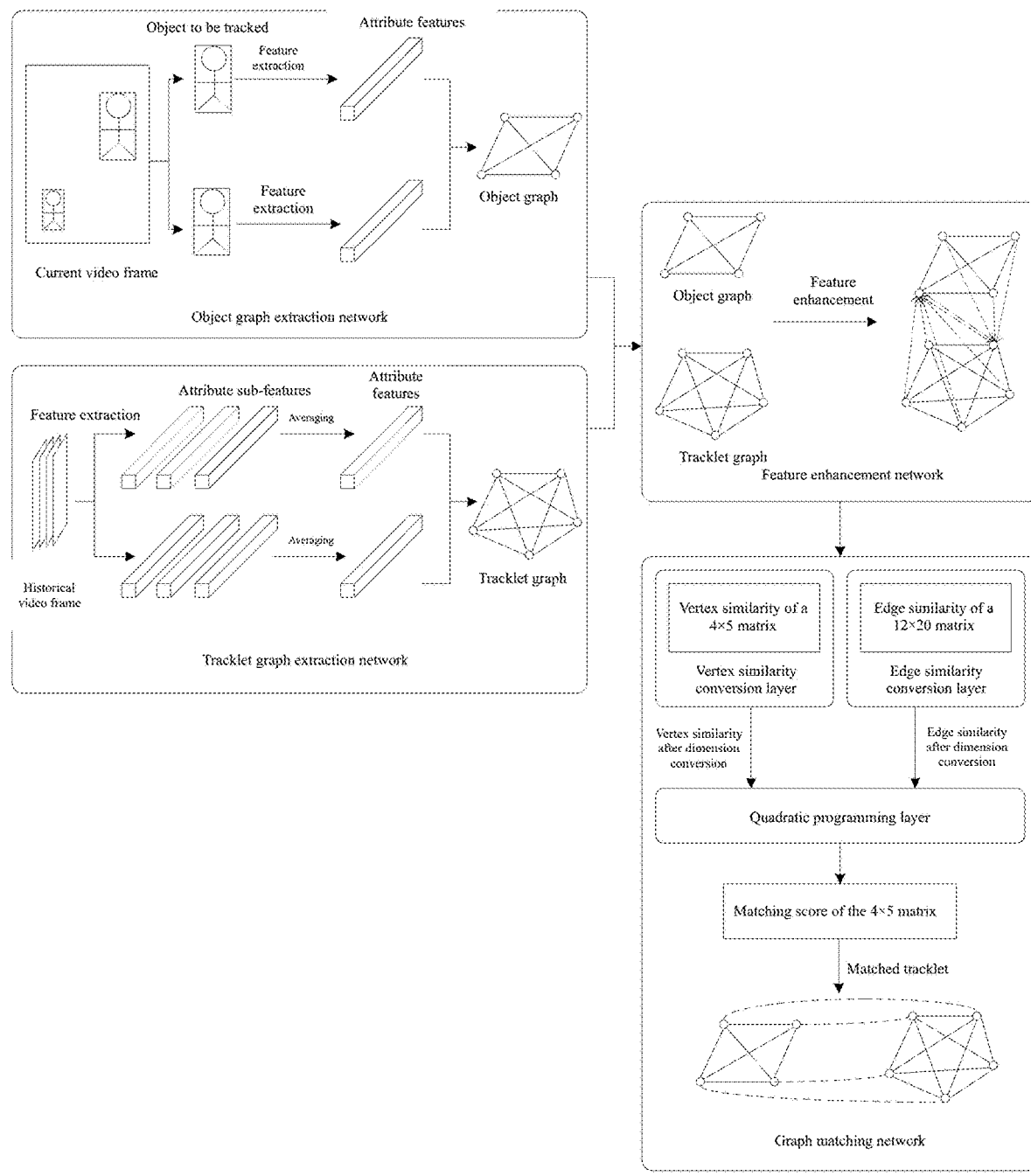
FIG. 4B is a schematic diagram of the principle of the graph matching process in the method according to embodiment IV of the present disclosure.

FIG. 4A is a flowchart of the multi-object tracking method according to embodiment IV of the present disclosure, and FIG. 4B is a schematic diagram of the principle of the graph matching process in the method according to embodiment IV of the present disclosure. Embodiment IV is optimized based on the above embodiment. Specifically, as shown in FIG. 4B, embodiment IV may adopt the multi-object tracking model trained in the training method for a multi-object tracking model provided in the above embodiments to perform specific multi-object tracking procedures.

Optionally, as shown in FIG. 4A, embodiment IV may comprise the following steps.

In S410, the tracklet graph is constructed according to the tracked tracklets in the historical video frame.

Optionally, in a video multi-object tracking scene, when performing multi-object tracking on a current video frame, tracking positions of the same object in historical video frames firstly require to be analyzed according to the multi-object tracking conditions in historical video frames already completing multi-object tracking, so as to determine tracked tracklets in the historical video frame, and a corresponding tracklet graph is constructed by taking each tracked tracklet as a corresponding vertex and connecting vertexes. As shown in FIG. 4B, the historical video frame may be inputted into a tracklet graph extraction network in the pre-trained multi-object tracking model, and the tracklet graph of the tracked tracklets in the historical video frame may be constructed by the tracklet graph extraction network.

In some implementations, in order to accurately obtain vertex features of vertexes in the tracklet graph, embodiment IV comprises the following steps: when constructing the tracklet graph, for each tracked tracklet, determining an associated object of the tracked tracklet in historical video frames; extracting attribute sub-features of the associated object of the tracked tracklet in the historical video frames and calculating corresponding attribute sub-feature mean value as the attribute feature of the tracked tracklet; and taking each tracked tracklet as a vertex, constructing the tracklet graph and obtaining the vertex features of each vertex of the tracklet graph.

Wherein, the associated object of each tracked tracklet in the historical video frames is the same object, the positions of the same object in the historical video frames may be connected into a tracked tracklet, and the attribute sub-features of each associated object pointed by the tracked tracklet in the historical video frames can be accurately extracted by adopting a preset feature extraction algorithm. Then, mean value processing is performed on the attribute sub-features of associated objects pointed by each tracked tracklet, so that the attribute features of the tracked tracklet may be obtained. For example, embodiment IV may comprises: calculating corresponding attribute sub-feature mean value by adopting a moving average mode according to the attribute sub-features of the associated object of each tracked tracklet in historical video frames, and then taking the attribute sub-features as the attribute features of the tracked tracklet, so that the accuracy and the comprehensiveness of the attribute features of the tracked tracklet are ensured. Then, after obtaining the attribute features of each tracked tracklet, each tracked tracklet may be taken as a corresponding vertex, vertexes are connected to construct a corresponding tracklet graph, and the vertex features of vertexes in the tracklet graph are determined according to the attribute features of tracked tracklets.

In addition, when an object graph of objects to be tracked in the current frame is constructed, the current frame may also be inputted into an object graph extraction network in the pre-trained multi-object tracking model, and the object graph of the objects to be tracked in the current frame is constructed by the object graph extraction network.

In S420, an object graph is constructed according to objects to be tracked in a current video frame.

In S430, vertex similarity and edge similarity between the object graph and the tracklet graph is calculated according to the vertex features and the edge features in the object graph and the tracklet graph.

Optionally, after the object graph of the objects to be tracked and the tracklet graph of the tracked tracklets are constructed, vertex features of each vertex and the edge features of each edge in the object graph and the tracklet graph are inputted into a graph matching network in the trained multi-object tracking model together, and feature similarity between each vertex in the object graph and vertexes in the tracklet graph is analyzed through a vertex similarity conversion layer in the graph matching network, so as to calculate the vertex similarity between the object graph and the tracklet graph. Meanwhile, feature similarity between each edge in the object graph and edges in the tracklet graph is analyzed through an edge similarity conversion layer in the graph matching network, so as to analyze the edge similarity between the object graph and the tracklet graph. The vertex similarity and the edge similarity between the object graph and the tracklet graph can accurately describe the similarity between every two vertexes and the similarity between every two edges in the object graph and the tracklet graph, so that the matching degree between each object to be tracked in the object graph and tracked tracklets in the tracklet graph is comprehensively analyzed by analyzing the vertex similarity and the edge similarity between the object graph and the tracklet graph.

In order to further improve the matching accuracy between vertexes in the object graph and the tracklet graph and to distinguish unmatched vertexes more easily through vertex features of vertexes in the object graph and the tracklet graph, embodiment IV can further comprises: performing feature enhancement on the calculated vertex features of the vertexes and edge features of each edge in the object graph and the tracklet graph through a feature enhancement network in the multi-object tracking model. Specifically, after the object graph and the tracklet graph are constructed, as shown in FIG. 4B, vertex features and edge features in the object graph and the tracklet graph are inputted into a pre-constructed feature enhancement network, feature enhancement is performed on the vertex features and the edge features in the object graph and the tracklet graph, and the vertex similarity and the edge similarity between the object graph and the tracklet graph are calculated by adopting the enhanced vertex features and edge features in the object graph and the tracklet graph.

According to the feature enhancement mode proposed for the feature enhancement network in the training method for a multi-object tracking model provided in the above embodiment, the feature similarity between vertexes in the object graph and vertexes in the tracklet graph is adopted as the corresponding weight, and then vertex features of vertexes in the tracklet graph are weighted and fused into vertex feature of each vertex in the object graph by adopting the corresponding weight, and vertex features of vertexes in the object graph are weighted and fused into vertex feature of each vertex in the tracklet graph, so as to perform feature enhancement on vertex features of vertexes in the object graph and the tracklet graph. The enhanced edge features are obtained by concatenating the enhanced vertex features; or according to the feature enhancement mode, the feature similarity between edges in the object graph and edges in the tracklet graph is adopted as corresponding weight, then the edge features of edges in the tracklet graph are weighted and fused into the edge feature of each edge of the object graph, or the edge features of edges in the object graph are weighted and fused into the edge feature of each edge of the tracklet graph by adopting the weight, so as to perform feature enhancement on the object graph and the tracklet graph, and the vertex similarity and the edge similarity between the object graph and the tracklet graph are calculated by adopting the vertex features and the edge features after feature enhancement.

In S440, matching scores between the object to be tracked in the object graph and the tracked tracklet in the tracklet graph is calculated according to the vertex similarity and the edge similarity.

Optionally, after the vertex similarity and the edge similarity between the object graph and the tracklet graph are calculated, the dimensions of the vertex similarity and the edge similarity between the object graph and the tracklet graph may be different because the number of vertexes and the number of edges in the object graph and the tracklet graph may be different. In order to ensure the efficient accuracy of calculating the corresponding matching score by performing fusion analysis on the vertex similarity and the edge similarity, embodiment IV also comprises: setting corresponding conversion dimensions for the vertex similarity and the edge similarity according to the number of vertexes in the object graph and the tracklet graph, so as to perform dimension conversion on the preliminarily calculated vertex similarity through a vertex similarity conversion layer in the graph matching network, and perform dimension conversion on the preliminarily calculated edge similarity through an edge similarity conversion layer in the graph matching network, so that the vertex similarity and the edge similarity after dimension conversion can be accurately and efficiently fused. Then, the vertex similarity and the edge similarity after the dimension conversion are directly substituted into a preset relaxation-set quadratic programming problem through a quadratic programming layer in the graph matching network, thereby calculating the matching score between each object to be tracked in the object graph and tracked tracklets in the tracklet graph.

In some implementations, as shown in FIG. 4B, if there are 4 objects to be tracked in the current video frame and 5 tracked tracklets in the historical video frame, there are 4 vertexes and 6 edges in the constructed object graph and 5 vertexes and 10 edges in the tracklet graph. The object graph and the tracklet graph are inputted into the feature enhancement network, and after feature enhancement is performed on the vertex features and the edge features in the object graph and the tracklet graph, the vertex similarity and the edge similarity between the object graph and the tracklet graph may be calculated according to the vertex features and the edge features after feature enhancement. Assuming that one edge comprises vertex A and vertex B, the edge is calculated according to the two edges, that is, an edge from the vertex A to the vertex B and the other edge from the vertex B to the vertex A; the corresponding edge features of the edge comprise the concatenation of vertex features from the vertex A to the vertex B and the concatenation of vertex features from the vertex B to vertex A. The corresponding edge similarity also comprises the similarity between edges in the same direction. The vertex similarity is a 4×5 matrix and the edge similarity is a 12×20 matrix. In order to ensure accurate and efficient fusion between the vertex similarity and the edge similarity, dimension conversion is performed on the vertex similarity through the vertex similarity conversion layer, and dimension conversion is performed on the edge similarity through the edge similarity conversion layer. For example, the vertex similarity is directly lengthened into a 1×20 matrix, and the edge similarity is subjected to similarity extension filling and is converted into a 20×20 matrix, so that accurate and efficient matrix fusion can be performed between the vertex similarity and the edge similarity after dimension conversion. After the vertex similarity and the edge similarity after the dimension conversion are directly substituted into a preset relaxation-set quadratic programming problem through the quadratic programming layer, the calculated matching score between each object to be tracked and tracked tracklets in the tracklet graph is a 4×5 matrix, which represents the matching degree between each vertex in the object graph and vertexes in the tracklet graph, so that the matched tracklet of each object to be tracked can be determined according to the matching score.

In S450, the matched tracklet of the object to be tracked is determined according to the matching scores.

In the technical scheme provided by embodiment IV, the tracklet graph of the tracked tracklets in the historical video frame is constructed by adopting the tracklet graph extraction network in the pre-trained multi-object tracking model, the object graph of the objects to be tracked in the current video frame is constructed by adopting the object graph extraction network in the multi-object tracking model, and then matching scores between each object to be tracked and tracked tracklets in the tracklet graph are calculated by fully referencing the vertex features and the edge features in the object graph and the tracklet graph through the graph matching network, so that the matched tracklet of each object to be tracked is determined, the accurate video multi-object tracking is realized, the problem of tracking failure when a certain object is occluded is prevented, the limitations of video multi-object tracking are avoided, and the robustness of video multi-object tracking is improved.

Embodiment V

Figure 5:
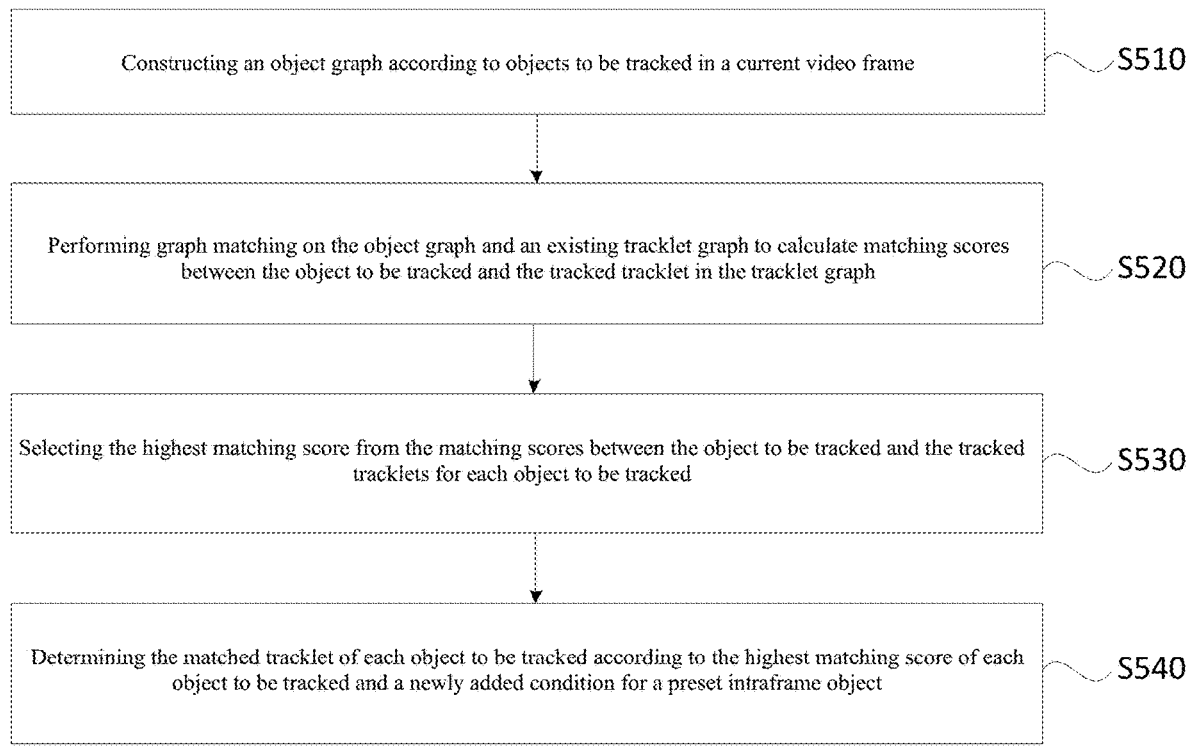
FIG. 5 is a flowchart of the multi-object tracking method according to embodiment V of the present disclosure.

FIG. 5 is a flowchart of the multi-object tracking method according to embodiment V of the present disclosure. Embodiment V is optimized based on the above embodiment. Specifically, as shown in FIG. 5, the present embodiment mainly explains in detail the specific matching process of determining a matched tracklet of each object to be tracked from the tracked tracklets according to the matching scores.

In some implementations, as shown in FIG. 5, embodiment V may comprise the following steps.

In S510, an object graph is constructed according to objects to be tracked in a current video frame.

In S520, graph matching on the object graph and an existing tracklet graph is performed to calculate matching scores between the object to be tracked and the tracked tracklet in the tracklet graph.

In S530, the highest matching score is selected from the matching scores between the object to be tracked and the tracked tracklets for each object to be tracked.

Optionally, after the matching scores between each object to be tracked in the object graph and tracked tracklets in the tracklet graph is calculated, there is a specific matching score between the object to be tracked and each tracked tracklet for each object to be tracked. Therefore, when finding out the tracked tracklet most matched with the object to be tracked, the highest matching score is required to be firstly selected from the matching scores between the object to be tracked and tracked tracklets, the tracked tracklet pointed by the highest matching score may be considered as the track most matched with the object to be tracked in the tracked tracklets, and then, whether the tracked tracklet pointed by the highest matching score is the real matched tracklet of the track to be tracked is further determined.

In S540, the matched tracklet of each object to be tracked is determined according to the highest matching score of each object to be tracked and a newly added condition for a preset intraframe object.

Optionally, because a certain object to be tracked in the current video frame may be newly added and does not appear in the historical video frame, so that a matched tracklet of the newly added object to be tracked does not exist in tracked tracklets in the historical video frame, it is firstly required to determine whether objects to be tracked are newly added objects in the current video frame or not when predicting the matched tracklet of each object to be tracked. For the newly added object, embodiment V presets a newly added condition for an intraframe object specifically comprising at least one of the followings: 1) the vertex similarity between the object to be tracked and each tracked tracklet in the tracklet graph is smaller than a preset similarity threshold; 2) the position difference between the center position of the object to be tracked in the current video frame and the object center position in each tracked tracklet in the tracklet graph is larger than a preset position difference value; and 3) there is no intersection between the object detection bounding box of the object to be tracked in the current video frame and the object detection bounding box of each tracked tracklet in the tracklet graph.

For condition 1), if the vertex similarity between a certain object to be tracked and each tracked tracklet in the tracklet graph is smaller than the preset similarity threshold, it indicates that the matching degree between the object to be tracked and tracked tracklets in the tracklet graph is low, and therefore the object to be tracked is taken as a newly added object in the current video frame. For condition 2), the mean value of the center position coordinates of the associated object pointed by each tracked tracklet in historical video frames in the tracklet graph is calculated to obtain the center position coordinate of the object of the tracked tracklet. If the position difference between the center position coordinate of a certain object to be tracked in the current video frame and the object center position coordinate in each tracked tracklet in the tracklet graph is larger than the preset position difference value, it indicates that the position difference between the object to be tracked and tracked tracklets is large, and therefore the object to be tracked is taken as a newly added object in the current video frame. For condition 3), when objects to be tracked is identified from the current video frame, object detection bounding boxs of objects to be tracked are marked, so that there is also an object detection bounding box in the associated object of the tracked tracklet in the historical video frame, and the object detection bounding box of each tracked tracklet can also be obtained by performing mean value processing on the object detection bounding box of the associated objects. If there is no intersection between the object detection bounding box of a certain object to be tracked in the current video frame and the object detection bounding box of each tracked tracklet in the tracklet graph, it indicates that the position difference between the object to be tracked and tracked tracklets is large, so that the object to be tracked is taken as a newly added object in the current video frame.

After the highest matching score between each object to be tracked and the tracked tracklets is selected, whether each object to be tracked meets a newly-added condition for a preset intraframe object or not is firstly determined. If a certain object to be tracked meets at least one of the newly-added conditions for the intraframe object, the object to be tracked may be determined to be a newly added object in the current video frame, which indicates that the object to be tracked never appears in the historical video frame, and the track of the object to be tracked appears in the current frame, so that the position of the newly added object in the current frame can be directly taken as the matched tracklet of the newly added object. However, for each remaining object to be tracked in the current video frame except the newly added object, the remaining object to be tracked has already appeared in the historical video frame, that is, there is the track of the remaining object to be tracked in tracked tracklets under the historical video frame. Therefore, the tracked tracklet pointed by the highest matching score of the remaining object to be tracked can be directly found out from tracked tracklets in the historical video frames, and the found tracked tracklet is taken as the matched tracklet of the remaining object to be tracked.

In addition, in order to ensure the accuracy of multi-object tracking, embodiment V comprises the following steps: when determining the matched tracklet of each object to be tracked according to the highest matching score of each object to be tracked and a newly added condition for a preset intraframe object, firstly rounding up the highest matching score in the matching scores between the object to be tracked and the tracked tracklets, and rounding down the other matching scores for each object to be tracked, so as to perform greedy rounding on the matching score between the object to be tracked in the object graph and the tracked tracklet in the tracklet graph to form a corresponding optimal matching score. The optimal matching score is a 0-1 matrix converted by a common score matrix, and the matched tracklet of each object to be tracked may be determined directly according to the optimal matching score and the newly-added condition for a preset intraframe object according to the above steps.

In the technical scheme provided by embodiment V, after the matching scores between the object to be tracked in the object graph and the tracked tracklet in the tracklet graph are calculated, the highest matching score is selected from the matching scores between the object to be tracked and the tracked tracklets for each object to be tracked, and then the matched tracklet of each object to be tracked is determined according to the highest matching score of each object to be tracked and the newly-added condition for the preset intraframe object, so that the newly added object in the current video frame is selected, the accurate video multi-object tracking is realized, and the robustness of the video multi-object tracking is improved.

Embodiment VI

Figure 6:
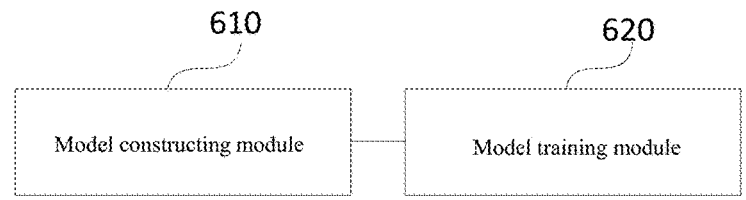
FIG. 6 is a schematic structural diagram of the training device for a multi-object tracking model according to embodiment VI of the present disclosure.

FIG. 6 is a schematic structural diagram of the training device for a multi-object tracking model according to embodiment VI of the present disclosure. As shown in FIG. 6, the device may comprise:

a model constructing module 610 for constructing an initial multi-object tracking model, wherein the multi-object tracking model comprises an object graph extraction network, a tracklet graph extraction network and a graph matching network; the object graph extraction network is configured for constructing an object graph according to objects to be tracked in a current video frame, the tracklet graph extraction network is configured for constructing a tracklet graph according to tracked tracklets in a historical video frame, and the graph matching network is configured for performing graph matching on the object graph and the tracklet graph to predict matched tracklets of the objects to be tracked; wherein the object graph and the tracklet graph comprise vertexes and edges connecting the vertexes, the vertexes of the object graph correspond to the objects to be tracked, the vertexes of the tracklet graph correspond to the tracked tracklets, and the edge features of the edges between the two vertexes in the object graph and the tracklet graph comprise an attribute relationship between the two vertexes; and a model training module 620 for performing joint training on networks in the multi-object tracking model according to a real matched tracklet and a predicted matched tracklet of the object to be tracked in training samples by adopting a preset loss function of the multi-object tracking model to obtain the trained multi-object tracking model.

In the technical scheme provided by embodiment VI, if multi-object tracking is realized through the multi-object tracking model, it is required to first train the multi-object tracking model, and the initially constructed multi-object tracking model comprises an object graph extraction network, a tracklet graph extraction network and a graph matching network, which are configured for executing object graph construction, tracklet graph construction and graph matching in the multi-object tracking process, respectively; the corresponding preset loss function is set for the multi-object tracking model, and joint training is performed on networks in the multi-object tracking model according to a real matched tracklet of each object to be tracked in training samples and the obtained matched tracklet predicted by the multi-object tracking model by adopting the preset loss function to obtain the trained multi-object tracking model without specially performing separate training on the networks in the multi-object tracking model, which improves the association among the networks in the multi-object tracking model and the accuracy of multi-object tracking.

Further, the vertexes have vertex features, the vertex features of the vertexes in the object graph are attribute features of the object to be tracked corresponding to the vertexes, the vertex features of the vertexes in the tracklet graph are attribute features of the tracked tracklet corresponding to the vertexes, and an attribute relationship between two vertexes in the edge features of edges between two vertexes in the object graph and the tracklet graph is a relationship between the attribute features of the two vertexes.

Further, the multi-object tracking model may further comprise a feature enhancement network, and the feature enhancement network is configured for performing feature enhancement on the vertex features and the edge features in the object graph and the tracklet graph, so that the graph matching network performs graph matching on the object graph and the tracklet graph according to the enhanced vertex features and edge features in the object graph and the tracklet graph.

Further, the graph matching network may be specifically configured for calculating vertex similarity and edge similarity between the object graph and the tracklet graph according to the enhanced vertex features and edge features in the object graph and the tracklet graph, calculating matching scores between the object to be tracked in the object graph and the tracked tracklet in the tracklet graph according to the vertex similarity and the edge similarity, and predicting a matched tracklet of the object to be tracked according to the matching scores.

Further, the training samples may comprise a real matched tracklet of the object to be tracked in each current frame in the historical video frame, and the model training module 620 may be specifically configured for:

constructing an object graph of objects to be tracked in a current video frame in training samples by adopting the object graph extraction network in the multi-object tracking model;

constructing a tracklet graph of tracked tracklets in a historical video frame in the training samples by adopting the tracklet graph extraction network in the multi-object tracking model;

performing feature enhancement on the vertex features and the edge features in the object graph and the tracklet graph by adopting the feature enhancement network in the multi-object tracking model, inputting the enhanced vertex features and edge features in the object graph and the tracklet graph into the graph matching network in the multi-object tracking model, and predicting a matched tracklet of the object to be tracked; and performing gradient back propagation on the graph matching network, the feature enhancement network, the tracklet graph extraction network and the object graph extraction network according to the real matched tracklet and the predicted matched tracklet of each object to be tracked in the current video frame in the training samples in the historical video frame by adopting the preset loss function of the multi-object tracking network to jointly train networks in the multi-object tracking model.

Further, the preset loss function may be a weighted binary cross entropy loss function, and weights in the preset loss function are set according to the number of vertexes in the object graph and the tracklet graph; the feature enhancement network is a cross graph convolutional network.

Further, the graph matching network may be composed of a vertex similarity conversion layer, an edge similarity conversion layer and a quadratic programming layer; the vertex similarity conversion layer is configured for calculating vertex similarity between the object graph and the tracklet graph and performing dimension conversion, the edge similarity conversion layer is configured for calculating edge similarity between the object graph and the tracklet graph and performing dimension conversion, and the quadratic programming layer is configured for calculating the matching scores using the vertex similarity and the edge similarity after dimension conversion based on a quadratic programming problem.

Further, the quadratic programming problem may be obtained by performing a corresponding transformation on a quadratic allocation problem after adjusting discrete allocation objects in the quadratic allocation problem to corresponding continuous programming objects.

Further, the vertex similarity conversion layer and the edge similarity conversion layer may set corresponding conversion dimensions according to the number of vertexes in the object graph and the tracklet graph.

Further, the attribute features of the vertexes may be represented as vector features, and the edge features of the edges between two vertexes may be represented as concatenated vectors or weighted vectors of the vector features corresponding to the two vertexes.

The training device for a multi-object tracking model provided by embodiment VI is applicable to the training method for a multi-object tracking model provided by any of the above embodiment, and has corresponding functions and beneficial effects.

Embodiment VII

Figure 7:
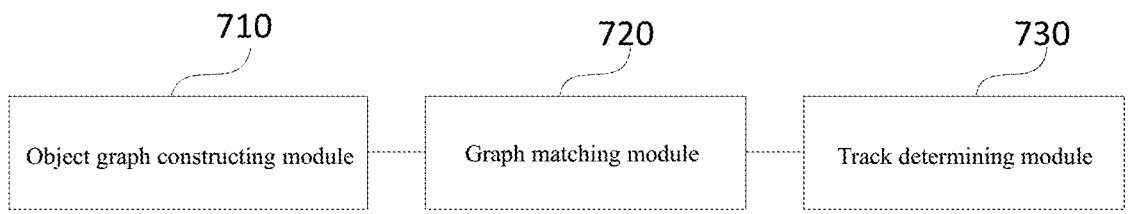
FIG. 7 is a schematic structural diagram of the multi-object tracking device according to embodiment VII of the present disclosure.

FIG. 7 is a schematic structural diagram of the multi-object tracking device according to embodiment VII of the present disclosure. As shown in FIG. 7, the device may comprise:

an object graph constructing module 710 for constructing an object graph according to objects to be tracked in a current video frame, wherein the object graph comprises vertexes and edges connecting the vertexes, the vertexes of the object graph correspond to the objects to be tracked, and the edge features of the edges between the two vertexes comprise an attribute relationship between the two vertexes;

a graph matching module 720 for performing graph matching on the object graph and an existing tracklet graph to calculate matching scores between the object to be tracked and the tracked tracklet in the tracklet graph, wherein the tracklet graph comprises vertexes and edges connecting the vertexes, the vertexes of the tracklet graph correspond to the existing tracked tracklets, and the edge features of the edges between the two vertexes comprise an attribute relationship between the two vertexes; and a tracklet determining module 730 for determining the matched tracklet of the object to be tracked according to the matching scores.

In the technical scheme provided by embodiment VII, the tracked tracklets is determined and the corresponding tracklet graph is constructed for the historical video frame when tracking the tracks of objects to be tracked in the current video frame, each vertex of the tracklet graph corresponds to each existing tracked tracklet, and the edge features of the edges between two vertexes comprise an attribute relationship between the two vertexes; then an object graph is constructed according to the objects to be tracked in the current video frame, each vertex in the object graph corresponds to each object to be tracked, and the edge features of the edges between the two vertexes comprise an attribute relationship between the two vertexes; then graph matching is performed on the object graph and the tracklet graph to calculate the matching scores between each object to be tracked and tracked tracklets in the tracklet graph, so that the matched tracklet of each object to be tracked is determined and the accurate video multi-object tracking is realized. The edge features in the object graph and the tracklet graph are fully referenced during graph matching, which prevents tracking failure when a certain object is occluded, avoids the limitations of video multi-object tracking, and improves the robustness of video multi-object tracking.

Further, the graph matching module 720 may comprises:

a similarity calculating unit for calculating vertex similarity and edge similarity between the object graph and the tracklet graph according to the vertex features and the edge features in the object graph and the tracklet graph; and a matching score calculating unit for calculating matching scores between the object to be tracked in the object graph and the tracked tracklet in the tracklet graph according to the vertex similarity and the edge similarity.

Further, the similarity calculating unit may be specifically configured for: inputting vertex features and the edge features in the object graph and the tracklet graph into a pre-constructed feature enhancement network, performing feature enhancement on the vertex features and the edge features in the object graph and the tracklet graph, and calculating the vertex similarity and the edge similarity between the object graph and the tracklet graph by adopting the enhanced vertex features and edge features in the object graph and the tracklet graph.

Further, the multi-object tracking device may further comprises: a tracklet graph constructing module for constructing a tracklet graph according to the tracked tracklets in the historical video frame.

Further, the tracklet graph constructing module may comprises:

an associated object determining unit for determining an associated object of each tracked tracklet in historical video frames for each tracked tracklet;

an attribute feature calculating unit for extracting attribute sub-features of the associated object of the tracked tracklet in the historical video frames and calculating corresponding attribute sub-feature mean value as the attribute feature of the tracked tracklet; and a tracklet graph constructing unit for constructing the tracklet graph by taking each tracked tracklet as a vertex and obtaining the vertex features of each vertex of the tracklet graph.

Further, the attribute feature calculating unit may be specifically configured for: calculating corresponding attribute sub-feature mean value by adopting a moving average mode according to the attribute sub-features of the associated object of the tracked tracklet in each historical video frame.

Further, the tracklet determining module 730 may comprises:

a matching score selecting unit for selecting the highest matching score from the matching scores between the object to be tracked and the tracked tracklets for each object to be tracked; and a tracklet determining unit for determining the matched tracklet of each object to be tracked according to the highest matching score of each object to be tracked and a newly added condition for a preset intraframe object.

Further, the tracklet determining unit may be specifically configured for: rounding up the highest matching score in the matching scores between the object to be tracked and the tracked tracklets, and rounding down the other matching scores to form a corresponding optimal matching score for each object to be tracked; and determining the matched tracklet of each object to be tracked according to the optimal matching score and the newly added condition for a preset intraframe object.

Further, the tracklet determining unit may be further specifically configured for: determining an object to be tracked in the objects to be tracked of the current video frame meeting the newly added condition for the preset intraframe object as a newly added object, and taking the position of the newly added object in the current video frame as the matched tracklet of the newly added object; and taking the tracked tracklet pointed by the highest matching score of the remaining object to be tracked as the matched tracklet of the remaining object to be tracked for each remaining object to be tracked in the current video frame except the newly added object.

Further, the newly added condition for the intraframe object may comprises at least one of the followings: the vertex similarity between the object to be tracked and each tracked tracklet in the tracklet graph is smaller than a preset similarity threshold; the position difference between the center position of the object to be tracked in the current video frame and the object center position in each tracked tracklet in the tracklet graph is larger than a preset position difference value; and there is no intersection between the object detection bounding box of the object to be tracked in the current video frame and the object detection bounding box of each tracked tracklet in the tracklet graph.

Further, the object graph constructing module 710 may be specifically configured for: extracting attribute features of each object to be tracked in the current video frame, taking each object to be tracked as a vertex, constructing an object graph, and obtaining vertex features of each vertex in the object graph.

Further, the multi-object tracking device may further comprises: a tracklet graph updating module for updating the tracklet graph according to the matched tracklet of the object to be tracked in the current video frame, and updating the vertex features of each vertex in the tracklet graph according to the attribute features of the matched tracklets of objects to be tracked in the current video frame.

The multi-object tracking device provided by embodiment VII is applicable to the multi-object tracking method provided by any of the above embodiment, and has corresponding functions and beneficial effects.

Embodiment VIII

Figure 8:
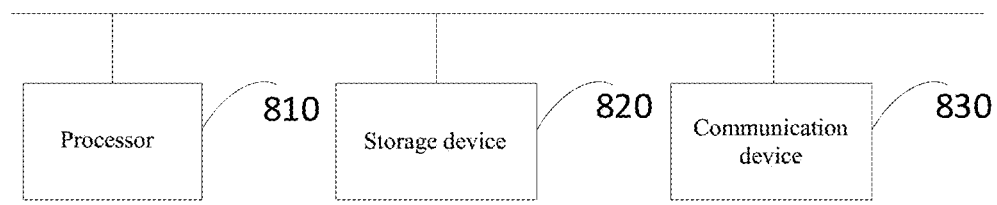
FIG. 8 is a schematic structural diagram of the computing device according to embodiment VIII of the present disclosure.

FIG. 8 is a schematic structural diagram of the computing device according to embodiment VIII of the present disclosure. As shown in FIG. 8, the computing device comprises a processor 810, a storage device 820 and a communication device 830, wherein there may be one or more processors 810 in the computing device, and one processor 810 is taken as an example in FIG. 8; the processor 810, the storage device 820 and the communication device 830 of the computing device may be connected by a bus or in other manners, and the bus connection is taken as an example in FIG. 8.

The storage device 820, as a computer-readable storage medium, can be configured for storing software programs, computer-executable programs and modules. The processor 810 executes various functional applications of the computing device and data processing by running the software programs, instructions and modules stored in the storage device 820, so as to implement the above-mentioned training method for a multi-object tracking model or multi-object tracking method.

The storage device 820 may mainly include a program storage area and a data storage area, wherein the program storage area may store an operating system and at least one functional application program; the data storage area may store data generated according to the use of a terminal, and the like. Furthermore, the storage device 820 may comprise a high speed random access memory, and may further comprise a non-volatile memory, such as at least one magnetic disk memory, flash memory, or other non-volatile solid-state memory. In some examples, the storage device 820 may further comprise a memory disposed remotely from a multifunction controller. All these remote memories may be connected to a vehicle via a network. Examples of the above network include, but are not limited to, the Internet, intranets, local area networks, mobile communication networks, and combinations thereof.

The communication device 830 may be configured for realizing a network connection or a mobile data connection between computing devices.

The computing device provided by embodiment XIII may be configured for executing the training method for a multi-object tracking model or the multi-object tracking method provided by any of the above embodiments, and has corresponding functions and beneficial effects.

Embodiment IX

Embodiment IX of the present disclosure further provides a computer-readable storage medium having a computer program stored thereon, wherein the program, when executed by a processor, implements the training method for a multi-object tracking model or the multi-object tracking method in any of the above embodiments. Certainly, the computer-executable instructions contained in the storage medium provided in the embodiment of the present disclosure are not limited to the procedures in the method described above, but may also comprise related procedures in the training method for a multi-object tracking model and the multi-object tracking method provided in any one of the embodiments of the present disclosure.

From the above description of the embodiments, it is obvious for those skilled in the art that the present disclosure can be implemented either through software and necessary general hardware or through hardware, but the former is a better embodiment in many cases. Based on such understanding, the technical scheme of the present disclosure or part thereof contributing to the prior art may be embodied in the form of a software product. The soft product can be stored in a computer-readable storage medium, such as a floppy disk, a read-only memory (ROM), a random access memory (RAM), a flash memory (FLASH), a hard disk or an optical disk of a computer, and comprises several instructions for enabling a computer device (which may be a personal computer, a server, or a network device) to implement the method according to the embodiments of the present disclosure.

It should be noted that, in the embodiment of the training device for a multi-object tracking model and the multi-object tracking device, the units and modules comprised are merely divided according to the functional logic, and other divisions are also possible as long as the corresponding functions can be implemented; in addition, the specific names of the functional units are only for the convenience of distinguishing from one another, and are not used for limiting the protection scope of the present disclosure.

It is to be noted that the above description is only preferred embodiments of the present disclosure and the principles of the employed technologies. Those skilled in the art will appreciate that the present disclosure is not limited to the particular embodiments described herein, and those skilled in the art can make various obvious changes, rearrangements and substitutions without departing from the protection scope of the present disclosure. Therefore, although the present disclosure has been described in some detail by the above embodiments, it is not limited to the above embodiments, and may further include other equivalent embodiments without departing from the spirit of the present disclosure, and the scope of the present disclosure is determined by the scope of the appended claims.

The disclosure may also include the following embodiments.

Embodiment 1. A training method for a multi-object tracking model, comprising: constructing an initial multi-object tracking model, wherein the multi-object tracking model comprises an object graph extraction network, a tracklet graph extraction network and a graph matching network; the object graph extraction network is configured for constructing an object graph according to objects to be tracked in a current video frame, the tracklet graph extraction network is configured for constructing a tracklet graph according to tracked tracklets in a historical video frame, and the graph matching network is configured for performing graph matching on the object graph and the tracklet graph to predict a matched tracklet of the object to be tracked; wherein the object graph and the tracklet graph each comprises vertexes and edges, the vertexes of the object graph correspond to the objects to be tracked, the vertexes of the tracklet graph correspond to the tracked tracklets, and each edge in the object graph and the tracklet graph connects two vertexes and comprises an edge feature comprising an attribute relationship between the two vertexes; and performing joint training on the networks in the multi-object tracking model according to a real matched tracklet and a predicted matched tracklet of an object to be tracked in a training sample by adopting a preset loss function of the multi-object tracking model to obtain trained multi-object tracking model.

Embodiment 2. The method according to embodiment 1, wherein the vertexes have vertex features, vertex features of the vertexes in the object graph comprise attribute features of the objects to be tracked, vertex features of the vertexes in the tracklet graph comprise attribute features of the tracked tracklets corresponding to the vertexes, and the attribute relationship comprises a relationship between the attribute feature es of the two vertexes.

Embodiment 3. The method according to embodiment 2, wherein the multi-object tracking model further comprises a feature enhancement network, and the feature enhancement network is configured for performing feature enhancement on the vertex features and the edge features in the object graph and the tracklet graph.

Embodiment 4. The method according to embodiment 3, wherein the graph matching network being configured for performing graph matching on the object graph and the tracklet graph comprises the graph matching network being configured for calculating vertex similarity and edge similarity between the object graph and the tracklet graph according to the enhanced vertex features and enhanced edge features in the object graph and the tracklet graph, calculating matching scores between the object to be tracked in the object graph and the tracked tracklet in the tracklet graph according to the vertex similarity and the edge similarity, and predicting a matched tracklet of the object to be tracked according to the matching scores.

Embodiment 5. The method according to embodiment 4, wherein the training sample comprises the real matched tracklet of the object to be tracked in each current video frame, and the performing joint training on the networks in the multi-object tracking model according to a real matched tracklet and a predicted matched tracklet of the object to be tracked in a training sample by adopting a preset loss function of the multi-object tracking model comprises: constructing an object graph of objects to be tracked in a current training frame in the training sample by adopting the object graph extraction network in the multi-object tracking model; constructing a tracklet graph of tracked tracklets in a historical training frame in the training sample by adopting the tracklet graph extraction network in the multi-object tracking model; performing feature enhancement on the vertex features and the edge features in the object graph and the tracklet graph by adopting the feature enhancement network in the multi-object tracking model, inputting the enhanced vertex features and edge features in the object graph and the tracklet graph into the graph matching network in the multi-object tracking model, and predicting a matched tracklet of the object to be tracked; and performing gradient back propagation on the graph matching network, the feature enhancement network, the tracklet graph extraction network and the object graph extraction network according to the real matched tracklet and the predicted matched tracklet of each object to be tracked in the current video frame in the training sample in the historical video frame by adopting the preset loss function of the multi-object tracking network to jointly train networks in the multi-object tracking model.

Embodiment 6. The method according to embodiment 5, wherein the preset loss function comprises a weighted binary cross entropy loss function, and weights in the preset loss function are set according to the number of vertexes in the object graph and the tracklet graph; the feature enhancement network comprises a cross graph convolutional network.

Embodiment 7. The method according to embodiment 4, wherein the graph matching network comprises a vertex similarity conversion layer, an edge similarity conversion layer and a quadratic programming layer; the vertex similarity conversion layer is configured for calculating vertex similarity between the object graph and the tracklet graph and performing dimension conversion, the edge similarity conversion layer is configured for calculating edge similarity between the object graph and the tracklet graph and performing dimension conversion, and the quadratic programming layer is configured for calculating the matching scores using the vertex similarity and the edge similarity after dimension conversion based on a quadratic programming problem.

Embodiment 8. The method according to embodiment 7, wherein the quadratic programming problem is obtained by performing a corresponding transformation on a quadratic allocation problem after adjusting discrete allocation objects in the quadratic allocation problem to corresponding continuous programming objects.

Embodiment 9. The method according to embodiment 7, wherein the vertex similarity conversion layer and the edge similarity conversion layer set corresponding conversion dimensions according to the number of vertexes in the object graph and the tracklet graph.

Embodiment 10. The method according to embodiment 1, wherein the attribute features of the vertexes are represented as vector features, and the edge features of the edges between two vertexes are represented as concatenated vectors or weighted vectors of the vector features corresponding to the two vertexes.

Embodiment 11. The method according to embodiment 1, wherein the object graph and the tracklet graph are complete graphs.

Embodiment 12. A non-transitory computer-readable storage medium, having a computer program stored thereon, wherein the program, when executed by a processor, implements the method according to any one of embodiment 1-11.

What is claimed is:

1. A multi-object tracking method,
wherein the multi-object tracking method is performed by a processor configured to implement a trained multi-object tracking neural network model including an object graph extraction network, a tracklet graph extraction network, and a graph matching network, the multi-object tracking method comprising:
constructing, by the processor, based on the object graph extraction network of the trained multi-object tracking neural network model, an object graph according to objects to be tracked in a current video frame, wherein the object graph comprises first vertexes and first edges connecting the first vertexes, the first vertexes of the object graph correspond to the objects to be tracked, and edge features of the first edges between two first vertexes comprise an attribute relationship between the two first vertexes;
constructing, by the processor, based on the tracklet graph extraction network of the trained multi-object tracking neural network model, a tracklet graph according to tracked tracklets of tracked objects in historical video frames, wherein the historical video frames comprise at least two historical frames, wherein the tracklet graph comprises second vertexes and second edges connecting the second vertexes, the second vertexes of the tracklet graph corresponds to the tracked tracklets of the tracked objects in the historical video frames, each of the tracked objects in the historical video frames corresponds to a tracked tracklet in the tracklet graph, and edge features of each second edge between two second vertexes comprise an attribute relationship between the two second vertexes;
performing, by the processor, based on the graph matching network of the trained multi-object tracking neural network model, graph matching on the object graph and the tracklet graph to calculate matching scores between the objects to be tracked and a tracked tracklet in the tracklet graph; and
determining, by the processor, based on the graph matching network of the trained multi-object tracking neural network model, matched tracklets of the objects to be tracked according to the matching scores;

wherein each of the first vertexes has first vertex features, each of the second vertexes has second vertex features, and the performing graph matching on the object graph and the tracklet graph comprises:

for each of the first vertexes in the object graph:
calculating a feature similarity between the first vertex features of the first vertex in the object graph and the second vertex features of each of the second vertexes in the tracklet graph;
obtaining an enhanced vertex feature of the first vertex by weighting and fusing the second vertex features of the second vertexes in the tracklet graph into the first vertex features of the first vertex based on the feature similarity; and
performing graph matching on the object graph and the tracklet graph based on the enhanced vertex feature of the first vertex.

2. The multi-object tracking method according to claim 1, wherein vertex features of the first vertexes in the object graph comprises attribute features of the object to be tracked corresponding to the first vertexes, vertex features of the second vertexes in the tracklet graph comprise attribute features of the tracked tracklet corresponding to the second vertexes, and the attribute relationship between the two first vertexes comprises a relationship between the attribute features of the two first vertexes, and the attribute relationship between the two second vertexes comprises a relationship between the attribute features of the two second vertexes.

3. The multi-object tracking method according to claim 2, wherein the performing graph matching on the object graph and the tracklet graph to calculate matching scores between the object to be tracked in the object graph and the tracked tracklet in the tracklet graph comprises:
calculating vertex similarity and edge similarity between the object graph and the tracklet graph according to the vertex features and the edge features in the object graph and the tracklet graph; and
calculating matching scores between the object to be tracked in the object graph and the tracked tracklet in the tracklet graph according to the vertex similarity and the edge similarity.

4. The multi-object tracking method according to claim 3, wherein the calculating vertex similarity and edge similarity between the object graph and the tracklet graph according to the vertex features and the edge features in the object graph and the tracklet graph comprises:
inputting the vertex features and the edge features in the object graph and the tracklet graph into a pre-constructed feature enhancement network, and performing feature enhancement on the vertex features and the edge features in the object graph and the tracklet graph; and
calculating the vertex similarity and the edge similarity between the object graph and the tracklet graph by adopting the enhanced vertex features and edge features in the object graph and the tracklet graph.

5. The multi-object tracking method according to claim 1, wherein the constructing the tracklet graph according to the tracked tracklets in the historical video frame comprises:
determining an associated object of the tracked tracklet in historical video frames for each tracked tracklet;
extracting attribute sub-features of the associated object of the tracked tracklet in the historical video frames and calculating corresponding attribute sub-feature mean value as the attribute feature of the tracked tracklet; and
taking each tracked tracklet as a second vertex, constructing the tracklet graph, and obtaining the vertex features of each second vertex of the tracklet graph.

6. The multi-object tracking method according to claim 5, wherein the calculating corresponding attribute sub-feature mean value comprises:
calculating corresponding attribute sub-feature mean value according to the attribute sub-features of the associated object of the tracked tracklet in each historical video frame by adopting a moving average mode.

7. The multi-object tracking method according to claim 1, wherein the determining the matched tracklet of the object to be tracked according to the matching scores comprises:
selecting a highest matching score from the matching scores between the object to be tracked and the tracked tracklets for each object to be tracked; and
determining the matched tracklet of each object to be tracked according to the highest matching score of each object to be tracked and a condition for adding a new object.

8. The multi-object tracking method according to claim 7, wherein the determining the matched tracklet of each object to be tracked according to the highest matching score of each object to be tracked and the condition for adding the new object comprises:
rounding up the highest matching score in the matching scores between the object to be tracked and the tracked tracklets, and rounding down the other matching scores to form a corresponding optimal matching score for each object to be tracked; and
determining the matched tracklet of each object to be tracked according to the optimal matching score and the condition for adding the new object.

9. The multi-object tracking method according to claim 7, wherein the determining the matched tracklet of each object to be tracked according to the highest matching score of each object to be tracked and the condition for adding the new object comprises:
determining an object to be tracked in the objects to be tracked of the current video frame meeting the condition for adding the new object as a newly added object, and taking a position of the newly added object in the current video frame as the matched tracklet of the newly added object.

10. The method according to claim 9, wherein the determining the matched tracklet of each object to be tracked according to the highest matching score of each object to be tracked and the condition for adding the new object further comprises:
taking the tracked tracklet pointed by the highest matching score of a remaining object to be tracked as the matched tracklet of the remaining object to be tracked for each remaining object to be tracked in the current video frame except the newly added object.

11. The method according to claim 7, wherein the condition for adding the new object comprises at least one of the following conditions:
a vertex similarity between the object to be tracked and each tracked tracklet in the tracklet graph is smaller than a preset similarity threshold;
a position difference between a center position of the object to be tracked in the current video frame and an object center position in each tracked tracklet in the tracklet graph is larger than a preset position difference value; and there is no intersection between an object detection bounding box of the object to be tracked in the current video frame and the object detection bounding box of each tracked tracklet in the tracklet graph.

12. The multi-object tracking method according to claim 1, wherein the constructing the object graph according to the objects to be tracked in the current video frame comprises:
   extracting attribute features of each object to be tracked in the current video frame; and
   taking each object to be tracked as a first vertex, constructing the object graph, and obtaining the vertex features of each first vertex in the object graph.

13. The multi-object tracking method according to claim 1, further comprising, after determining the matched tracklet of the object to be tracked according to the matching scores:
   updating the tracklet graph according to the matched tracklet of the object to be tracked in the current video frame, and updating the vertex features of each vertex in the tracklet graph according to the attribute features of the matched tracklets of objects to be tracked in the current video frame.

14. A training method for a multi-object tracking model, comprising:
   constructing an initial multi-object tracking model, wherein the multi-object tracking model comprises an object graph extraction network, a tracklet graph extraction network and a graph matching network; the object graph extraction network is configured to construct an object graph according to objects to be tracked in a current video frame, the tracklet graph extraction network is configured to construct a tracklet graph according to tracked tracklets of tracked objects in historical video frames, and the graph matching network is configured to perform graph matching on the object graph and the tracklet graph to predict a matched tracklet of the object to be tracked; wherein the historical video frames comprise at least two historical frames, the object graph and the tracklet graph each comprises vertexes and edges, the vertexes of the object graph correspond to the objects to be tracked in the current video frame, the vertexes of the tracklet graph correspond to the tracked tracklets of tracked objects in historical video frames, each of the tracked objects in the historical video frames corresponds to a tracked tracklet in the tracklet graph, and each edge in the object graph and the tracklet graph connects two vertexes and comprises an edge feature comprising an attribute relationship between the two vertexes; and
   performing joint training on the networks in the multi-object tracking model according to a real matched tracklet and a predicted matched tracklet of an object to be tracked in a training sample by adopting a preset loss function of the multi-object tracking model to obtain trained multi-object tracking model;
   wherein each of the vertexes of the object graph has first vertex features, each of the vertexes of the tracklet graph has second vertex features, and the graph matching on the object graph and the tracklet graph is performed by:
   for each of the first vertexes in the object graph:
      calculating a feature similarity between the first vertex features of the first vertex in the object graph and the second vertex features of each of the second vertexes in the tracklet graph;
      obtaining an enhanced vertex feature of the first vertex by weighting and fusing the second vertex features of the second vertexes in the tracklet graph into the first vertex features of the first vertex based on the feature similarity; and
   performing graph matching on the object graph and the tracklet graph based on the enhanced vertex feature of the first vertex.

15. The training method according to claim 14, wherein the vertexes in the object graph have vertex features comprising attribute features of the objects to be tracked, the vertexes in the tracklet graph have vertex features comprising attribute features of the tracked tracklets, and the attribute relationship comprises a relationship between the attribute features of the two vertexes.

16. The training method according to claim 15, wherein the multi-object tracking model further comprises a feature enhancement network, and the feature enhancement network is configured for performing feature enhancement on the vertex features and the edge features in the object graph and the tracklet graph.

17. The training method according to claim 16, wherein the graph matching network being configured for performing graph matching on the object graph and the tracklet graph comprises the graph matching network being configured for calculating vertex similarity and edge similarity between the object graph and the tracklet graph according to the enhanced vertex features and enhanced edge features in the object graph and the tracklet graph, calculating matching scores between the object to be tracked in the object graph and the tracked tracklet in the tracklet graph according to the vertex similarity and the edge similarity, and predicting a matched tracklet of the object to be tracked according to the matching scores.

18. The training method according to claim 17, wherein the training sample comprises a real matched tracklet of the object to be tracked in each current video frame, and the performing joint training on the networks in the multi-object tracking model according to a real matched tracklet and a predicted matched tracklet of the object to be tracked in a training sample by adopting a preset loss function of the multi-object tracking model comprises:
   constructing an object graph of objects to be tracked in a current training frame in the training sample by adopting the object graph extraction network in the multi-object tracking model;
   constructing a tracklet graph of tracked tracklets in a historical training frame in the training sample by adopting the tracklet graph extraction network in the multi-object tracking model;
   performing feature enhancement on the vertex features and the edge features in the object graph and the tracklet graph by adopting the feature enhancement network in the multi-object tracking model, inputting the enhanced vertex features and edge features in the object graph and the tracklet graph into the graph matching network in the multi-object tracking model, and predicting a matched tracklet of the object to be tracked; and
   performing gradient back propagation on the graph matching network, the feature enhancement network, the tracklet graph extraction network and the object graph extraction network according to the real matched tracklet and the predicted matched tracklet of each object to be tracked in the current video frame in the training sample in the historical video frame by adopting the preset loss function of the multi-object tracking network to jointly train networks in the multi-object tracking model.

19. A computing device, comprising:
one or more processors; and
a storage device for storing one or more programs;
wherein the one or more processors, when executing the one or more programs, are configured to implement a trained multi-object tracking neural network model including an object graph extraction network, a tracklet graph extraction network, and a graph matching network and perform a multi-object tracking method comprising:

constructing, based on the object graph extraction network of the trained multi-object tracking neural network model, an object graph according to objects to be tracked in a current video frame, wherein the object graph comprises first vertexes and first edges connecting the first vertexes, the first vertexes of the object graph correspond to the objects to be tracked, and edge features of the first edges between the two first vertexes comprise an attribute relationship between the two first vertexes;

constructing, based on the tracklet graph extraction network of the trained multi-object tracking neural network model, a tracklet graph according to tracked tracklets of tracked objects in historical video frames, wherein the historical video frames comprise at least two historical frames, the tracklet graph comprises second vertexes and second edges connecting the second vertexes, the second vertexes of the tracklet graph corresponds to the tracked tracklets of the tracked objects in the historical video frames, each of the tracked objects in the historical video frames corresponds to a tracked tracklet in the tracklet graph, and edge features of each second edge between two second vertexes comprise an attribute relationship between the two second vertexes;

performing, based on the graph matching network of the trained multi-object tracking neural network model, graph matching on the object graph and a tracklet graph to calculate matching scores between the object to be tracked and a tracked tracklet in the tracklet graph; and determining, based on the graph matching network of the trained multi-object tracking neural network model, matched tracklets of the objects to be tracked according to the matching scores;

wherein each of the first vertexes has first vertex features, each of the second vertexes has second vertex features, and performing graph matching on the object graph and the tracklet graph comprises:

for each of the first vertexes in the object graph:

calculating a feature similarity between the first vertex features of the first vertex in the object graph and the second vertex features of each of the second vertexes in the tracklet graph;

obtaining an enhanced vertex feature of the first vertex by weighting and fusing the second vertex features of the second vertexes in the tracklet graph into the first vertex features of the first vertex based on the feature similarity; and performing graph matching on the object graph and the tracklet graph based on the enhanced vertex feature of the first vertex.

* * * * *